(12) United States Patent
Han et al.

(10) Patent No.: US 12,333,147 B2
(45) Date of Patent: Jun. 17, 2025

(54) NETWORK INTERFACE CARD, CONTROLLER, STORAGE APPARATUS, AND PACKET SENDING METHOD

(71) Applicant: HUAWEI TECHNOLOGIES CO., LTD., Guangdong (CN)

(72) Inventors: Zhaojiao Han, Shenzhen (CN); Xindong Luo, Shenzhen (CN); Jiyuan Chen, Shenzhen (CN); Xuhui Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 18/308,118

(22) Filed: Apr. 27, 2023

(65) Prior Publication Data

US 2023/0259284 A1  Aug. 17, 2023

Related U.S. Application Data

(63) Continuation of application No. PCT/CN2021/124792, filed on Oct. 19, 2021.

(30) Foreign Application Priority Data

Oct. 28, 2020  (CN) .......................... 202011174175.6

(51) Int. Cl.
*G06F 3/06*  (2006.01)
*G06F 13/28*  (2006.01)
*G06F 15/173*  (2006.01)
*H04L 1/00*  (2006.01)
(Continued)

(52) U.S. Cl.
CPC .......... *G06F 3/0611* (2013.01); *G06F 3/0646* (2013.01); *G06F 3/0683* (2013.01); *G06F 13/28* (2013.01); *G06F 15/17331* (2013.01); *G06F 2213/3808* (2013.01)

(58) Field of Classification Search
CPC ............................ G06F 13/28; H04L 67/1097
See application file for complete search history.

(56) References Cited

U.S. PATENT DOCUMENTS

| 7,688,838 | B1 | 3/2010 | Aloni et al. |
| 2014/0258438 | A1* | 9/2014 | Ayoub .................... G06F 13/28 709/212 |
| 2018/0067893 | A1* | 3/2018 | Raindel ............. G06F 15/17331 |

(Continued)

OTHER PUBLICATIONS

Extended European Search Report issued in EP21884986.7, dated Mar. 12, 2024, 7 pages.

(Continued)

*Primary Examiner* — Getente A Yimer

(57) ABSTRACT

A network interface card, a controller, a storage apparatus, and a packet sending method are disclosed, and relate to the storage field to reduce a delay of an RDMA read operation. The network interface card includes: a processing module, configured to: in response to a doorbell signal of a controller, obtain a work queue element (WQE) from a send queue (SQ) corresponding to the controller, where the doorbell signal indicates that there is a to-be-sent message in a storage space to which at least one WQE points in the SQ, the WQE includes indication information, and the indication information indicates a type of a first remote direct memory access (RDMA) packet scheduled by the WQE.

14 Claims, 16 Drawing Sheets

(51) Int. Cl.
*H04L 1/06* (2006.01)
*H04L 1/1607* (2023.01)

(56) References Cited

U.S. PATENT DOCUMENTS

2018/0183699 A1* 6/2018 Koren ................... H04L 43/10
2019/0089641 A1* 3/2019 Shattah ............... H04L 63/1466
2020/0026656 A1* 1/2020 Liao ................... H04L 67/1097

OTHER PUBLICATIONS

InfiniBand Architecture Specification vol. 1, Release 1.3, Mar. 3, 2015, total 1842 pages.
NVM Express over Fabrics, Revision 1.0a, Jul. 17, 2018, total 51 pages.

* cited by examiner

NETWORK INTERFACE CARD, CONTROLLER, STORAGE APPARATUS, AND PACKET SENDING METHOD

CROSS-REFERENCE TO RELATED APPLICATIONS

This application is a continuation of International Application No. PCT/CN2021/124792, filed on Oct. 19, 2021, which claims priority to Chinese Patent Application No. 202011174175.6, filed on Oct. 28, 2020. The disclosures of the aforementioned applications are hereby incorporated by reference in their entireties.

TECHNICAL FIELD

The present disclosure relates to the storage field, and in particular, to a network interface card, a controller, a storage apparatus, and a packet sending method.

BACKGROUND

Currently, a plurality of pieces of data are not stored locally, but stored in a remote storage apparatus. As shown in FIG. 1, an embodiment of the present disclosure provides a storage system, including a storage apparatus 11, at least one host client 12, and a switch 13. The storage apparatus 11 is connected to the switch 13 by using a front-end fabric, the switch 13 is connected to the at least one host client 12, and the storage apparatus 11 may provide a data storage service for a plurality of host clients 12.

The storage apparatus 11 includes a plurality of controllers 111, at least one network interface card (NIC) 112, and a disk enclosure 113. The controller 111 includes a processor, a memory, and software. A plurality of controllers may work in a load sharing mode to improve a throughput and reliability of the storage system. The disk enclosure 113 is provided with a storage medium such as a hard disk drive (HDD) or a solid state drive (SSD). The NIC 112 has a plurality of high-speed serial computer expansion bus standard (peripheral component interconnect, PCIe) interfaces that are separately connected to each controller 111, and may distribute read and write requests from the host client 12 to the plurality of controllers 111 to implement parallel processing. The controller 111 may obtain the read request from the host client 12 by using the NIC 112, read I/O data from a hard disk in the disk enclosure 113, and the NIC 112 returns the I/O data to the host client 12. The controller 111 may further obtain the write request from the host client 12 by using the NIC 112, and write the I/O data obtained by using the NIC 112 into the hard disk in the disk enclosure 113.

With emergence of a solid state disk (SSD) based on a non-volatile memory specification (non volatile memory express, NVMe), more front-end fabrics use a switched network-based NVMe (NVMe over fabric, NoF) fabric. Remote direct memory access (RDMA) is a standard in a NoF network, and can reduce a delay in accessing data by a storage apparatus.

As shown in FIG. 2, in an RDMA read operation of the RDMA, the host client serves as a requester to send an I/O read command to the storage apparatus, the storage apparatus serves as a responder to receive the I/O read command, and the NIC of the storage apparatus distributes the I/O read command to different controllers for parallel processing. The NIC of the storage apparatus sequentially sends the I/O data and an I/O response to the host client. For fairness, when sending a message to the host client, the NIC needs to poll all controllers to determine whether there is a message to be sent. To be specific, after sending I/O data of a controller, the NIC starts to send another message of a next controller, and sends an I/O response of the processor only when the controller is polled next time. In this way, an interval between I/O data and an I/O response of a same controller is long. This increases a delay of the RDMA read operation.

SUMMARY

Embodiments of the present disclosure provide a network interface card, a controller, a storage apparatus, and a packet sending method to reduce a delay of an RDMA read operation.

To achieve the foregoing objectives, the following technical solutions are used in embodiments of the present disclosure.

According to a first aspect, a network interface card is provided, including: a second processing module, configured to: in response to a doorbell signal of a first controller, obtain a first work queue element WQE from a first send queue SQ corresponding to the first controller, where the doorbell signal indicates that there is a to-be-sent message in a storage space to which at least one WQE points in the first SQ, the first WQE includes indication information, and the indication information indicates a type of a first remote direct memory access RDMA packet scheduled by the first WQE; and a second transceiver module, configured to: if the indication information indicates that the type of the first RDMA packet is a tail packet or a single packet of I/O data, send, to a host client before the second processing module polls an SQ of a next controller, the first RDMA packet and a second RDMA packet scheduled by a next WQE of the first WQE in the first SQ.

According to the foregoing network interface card provided in this embodiment, a network interface card (NIC) of a storage apparatus obtains the first WQE from the first SQ of the first controller, where the first WQE includes the indication information, and the indication information indicates the type of the first RDMA packet scheduled by the first WQE; and if the indication information indicates that the type of the first RDMA packet is the tail packet or the single packet of the I/O data, sends, to the host client before polling the SQ of the next controller, the first RDMA packet and the second RDMA packet (that is, an RDMA packet of an I/O response) scheduled by the next WQE of the first WQE in the first SQ. In this way, after receiving the tail packet or the single packet of the I/O data, the host client can quickly receive the corresponding I/O response, and determine to complete an RDMA read operation. There is no need to wait for the NIC to poll the first controller next time. Therefore, a delay of the RDMA read operation can be reduced.

In a possible implementation, the second processing module is further configured to perform data integrity function DIF check on the first RDMA packet. The second transceiver module is specifically configured to: if the indication information indicates that the type of the first RDMA packet is the tail packet or the single packet of the I/O data, and the DIF check succeeds, send, to the host client before the second processing module polls the SQ of the next controller, the first RDMA packet and the second RDMA packet scheduled by the next WQE of the first WQE in the first SQ. The DIF check can protect data integrity and consistency by adding information such as check data to data.

In a possible implementation, the second transceiver module is further configured to: if the DIF check fails, send a third RDMA packet to the host client, where the third RDMA packet indicates that the DIF check on the first RDMA packet fails. In this way, the host client can learn of an error in obtaining the I/O data.

In a possible implementation, the type of the first remote direct memory access RDMA packet includes an initial packet, an intermediate packet, the tail packet, or the single packet of the I/O data. This implementation discloses several possible types of the first RDMA packet.

According to a second aspect, a controller is provided, including: a first processing module, configured to submit a first work queue element WQE to a first send queue SQ, where the first WQE includes indication information, and the indication information indicates a type of a first remote direct memory access RDMA packet scheduled by the first WQE; and a first transceiver module, further configured to send a doorbell signal to a network interface card, where the doorbell signal indicates that there is a to-be-sent message in a storage space to which at least one WQE points in the first SQ.

According to the controller provided in this embodiment, the indication information is added to the WQE to indicate the type of the first remote direct memory access RDMA packet scheduled by the first WQE, that is, an initial packet, an intermediate packet, a tail packet, or a single packet of I/O data, and notify the network interface card to: if the indication information indicates that the type of the first RDMA packet is the tail packet or the single packet of the I/O data, send, to a host client before polling an SQ of a next controller, the first RDMA packet and a second RDMA packet (that is, an RDMA packet of an I/O response) scheduled by a next WQE of the first WQE in the first SQ. In this way, after receiving the tail packet or the single packet of the I/O data, the host client can quickly receive the corresponding I/O response, and determine to complete an RDMA read operation. There is no need to wait for the NIC to poll the first controller next time. Therefore, a delay of the RDMA read operation can be reduced.

In a possible implementation, the type of the first remote direct memory access RDMA packet includes the initial packet, the intermediate packet, the tail packet, or the single packet of the I/O data. This implementation discloses several possible types of the first RDMA packet.

According to a third aspect, a storage apparatus is provided, including the network interface card according to any one of the first aspect and the implementations of the first aspect, and the controller according to the second aspect.

According to a fourth aspect, a packet sending method is provided, including: in response to a doorbell signal of a first controller, obtaining a first work queue element WQE from a first send queue SQ corresponding to the first controller, where the doorbell signal indicates that there is a to-be-sent message in a storage space to which at least one WQE points in the first SQ, the first WQE includes indication information, and the indication information indicates a type of a first remote direct memory access RDMA packet scheduled by the first WQE; and if the indication information indicates that the type of the first RDMA packet is a tail packet or a single packet of I/O data, sending, to a host client before polling an SQ of a next controller, the first RDMA packet and a second RDMA packet scheduled by a next WQE of the first WQE in the first SQ.

In a possible implementation, if the indication information indicates that the type of the first RDMA packet is a tail packet or a single packet of I/O data, the sending, to a host client before polling an SQ of a next controller, the first RDMA packet and a second RDMA packet scheduled by a next WQE of the first WQE in the first SQ includes: performing data integrity function DIF check on the first RDMA packet; and if the indication information indicates that the type of the first RDMA packet is the tail packet or the single packet of the I/O data, and the DIF check succeeds, sending, to the host client before the second processing module polls the SQ of the next controller, the first RDMA packet and the second RDMA packet scheduled by the next WQE of the first WQE in the first SQ.

In a possible implementation, the method further includes: if the DIF check fails, sending a third RDMA packet to the host client, where the third RDMA packet indicates that the DIF check on the first RDMA packet fails.

In a possible implementation, the type of the first remote direct memory access RDMA packet includes an initial packet, an intermediate packet, the tail packet, or the single packet of the I/O data.

According to a fifth aspect, a packet sending method is provided, including: submitting a first work queue element WQE to a first send queue SQ, where the first WQE includes indication information, and the indication information indicates a type of a first remote direct memory access RDMA packet scheduled by the first WQE; and sending a doorbell signal to a network interface card, where the doorbell signal indicates that there is a to-be-sent message in a storage space to which at least one WQE points in the first SQ.

In a possible implementation, the type of the first remote direct memory access RDMA packet includes an initial packet, an intermediate packet, a tail packet, or a single packet of I/O data.

According to a sixth aspect, a computer-readable storage medium is provided. The computer-readable storage medium stores a computer program. When the computer-readable storage medium is run on a computer, the computer is enabled to perform the method according to any one of the fourth aspect and the implementations of the fourth aspect, or the fifth aspect and the implementations of the fifth aspect.

According to a seventh aspect, a computer program product including instructions is provided. When the instructions are run on a computer or a processor, the computer or the processor is enabled to perform the method according to any one of the fourth aspect and the implementations of the fourth aspect, or the fifth aspect and the implementations of the fifth aspect.

For technical effects of the third aspect to the seventh aspect, refer to technical effects of any one of the first aspect and the implementations of the first aspect, and the second aspect.

DESCRIPTION OF EMBODIMENTS

Figure 1:
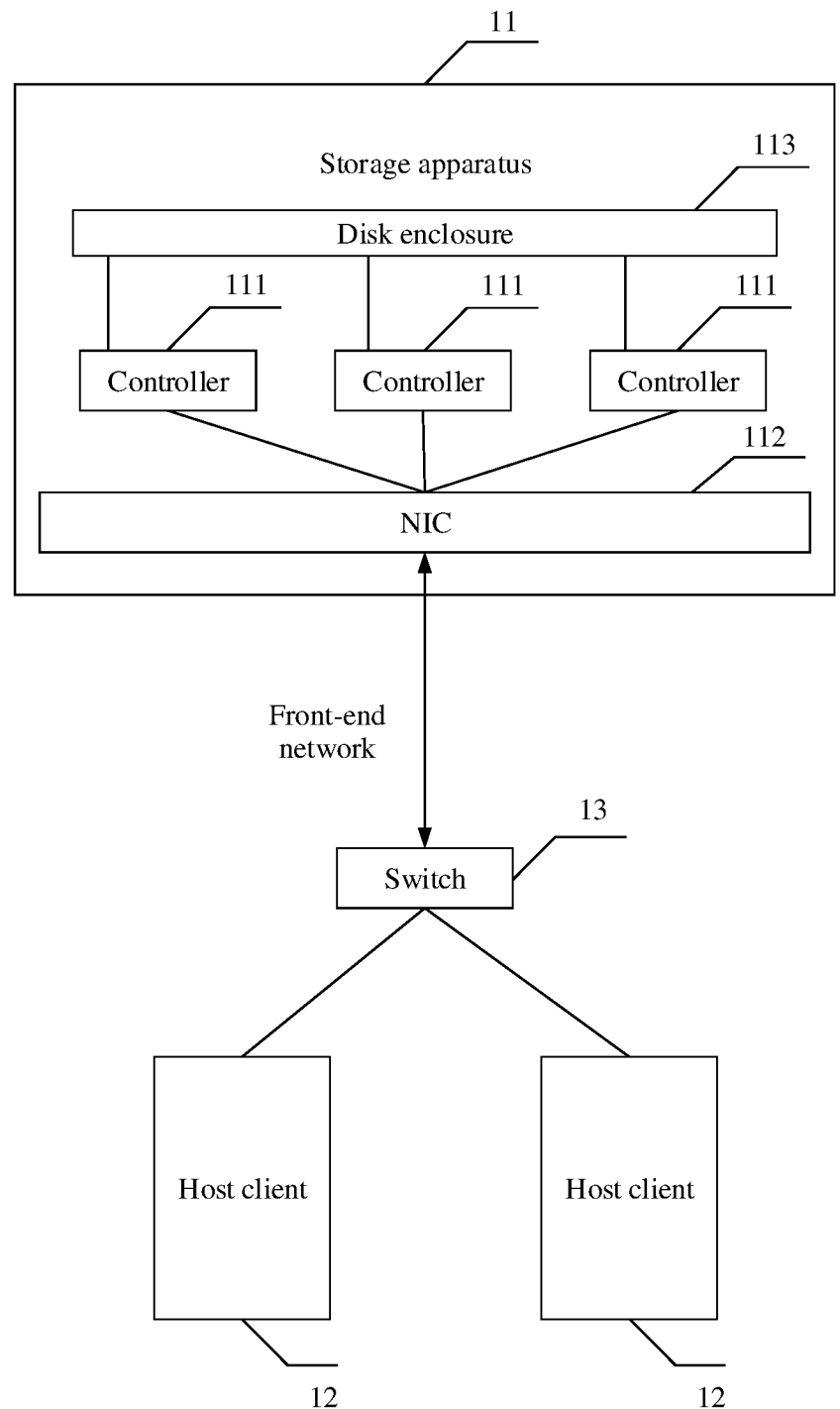
FIG. 1 is a schematic diagram of an architecture of a storage system according to an embodiment of the present disclosure.
Figure 2:
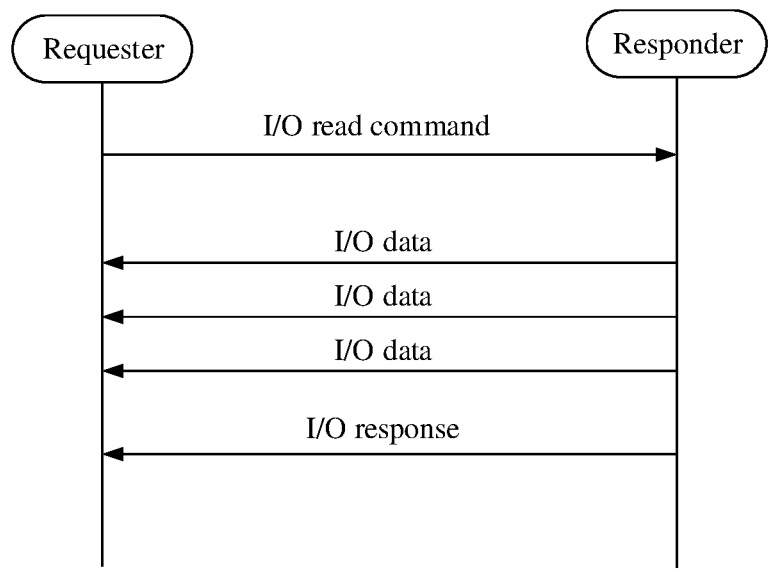
FIG. 2 is a schematic flowchart of an RDMA read operation according to an embodiment of the present disclosure.

Terms such as "component", "module", and "system" used in the present disclosure indicate computer-related entities. The computer-related entities may be hardware, firmware, combinations of hardware and software, software, or software in running. For example, a component may be, but is not limited to, a process that is run on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and based on, for example, a signal having one or more data packets (for example, data from one component, where the component interacts with another component in a local system or a distributed system, and/or interacts with another system by using a network such as the Internet by using a signal).

The following describes concepts in the present disclosure.

A storage apparatus in the present disclosure may be referred to as a storage server, a storage array, a blade server, or the like. A name is not limited. The storage apparatus may include at least one controller and at least one network interface card (NIC). The controller may include but is not limited to a processor and a memory. The processor runs an operating system and an application program.

The processor in embodiments of the present disclosure may be a chip. For example, the processor may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (programmable logic device, PLD), or another integrated chip.

The memory in embodiments of the present disclosure may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitation, a plurality of forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memories in the systems and methods described in this specification include but are not limited to these memories and any memory of another suitable type.

The NIC in embodiments of the present disclosure may also be referred to as a network interface controller, a network adapter, a network interface card or the like, or a local area network adapter (LAN adapter), and is computer hardware designed to allow a computer to perform communication on a computer network.

To improve system reliability, the storage apparatus uses a multi-controller architecture solution to support a plurality of controllers to provide a data storage service for one or more host clients. Mid-range and high-end storage apparatuses use a multi-host NIC to implement a front-end fabric interface. The plurality of controllers share one NIC by using different PCIe channels, and each controller serves as an independent network node.

The storage apparatus is connected to the host client by using a front-end fabric, and may provide the data storage service for a plurality of host clients. With emergence of an NVMe SSD, a protocol used by the host client to access the storage apparatus transits from a small computer system interface (SCSI) to an NVMe. Correspondingly, the front-end fabric also transits from a fiber channel (FC) network and a transmission control protocol/Internet protocol (TCP/IP) network to a NoF network.

A NoF protocol supports operations of a memory type and a message type. A PCIe supports the operations of the memory type, the FC supports the operations of the message type, and RDMA supports the operations of the memory type and the message type.

The RDMA may transmit data in a storage space of the storage apparatus as a message to a storage space of the host client in a form of an RDMA packet by using the front-end fabric, or transmit data in a storage space of the host client as a message to a storage space of the storage apparatus in a form of an RDMA packet by using the front-end fabric. These transmission and copy work are mainly performed by the storage apparatus and a network interface card (for example, an RDMA network interface card (RNIC)) of the host client, and do not need to be performed by a processor. Therefore, performance of the host client is not affected.

Currently, a hardware implementation of the RDMA includes infiniband (IB), RDMA over converged Ethernet (RoCE) (including RoCEv1 and RoCEv2), an Internet wide area RDMA protocol (iWARP), and the like. The infiniBand is a network specially designed for the RDMA to ensure hardware-level reliable transmission. The RoCE and the iWARP are Ethernet-based RDMA technologies and support verbs interfaces. The RoCE also supports the hardware-level reliable transmission.

Figure 3:
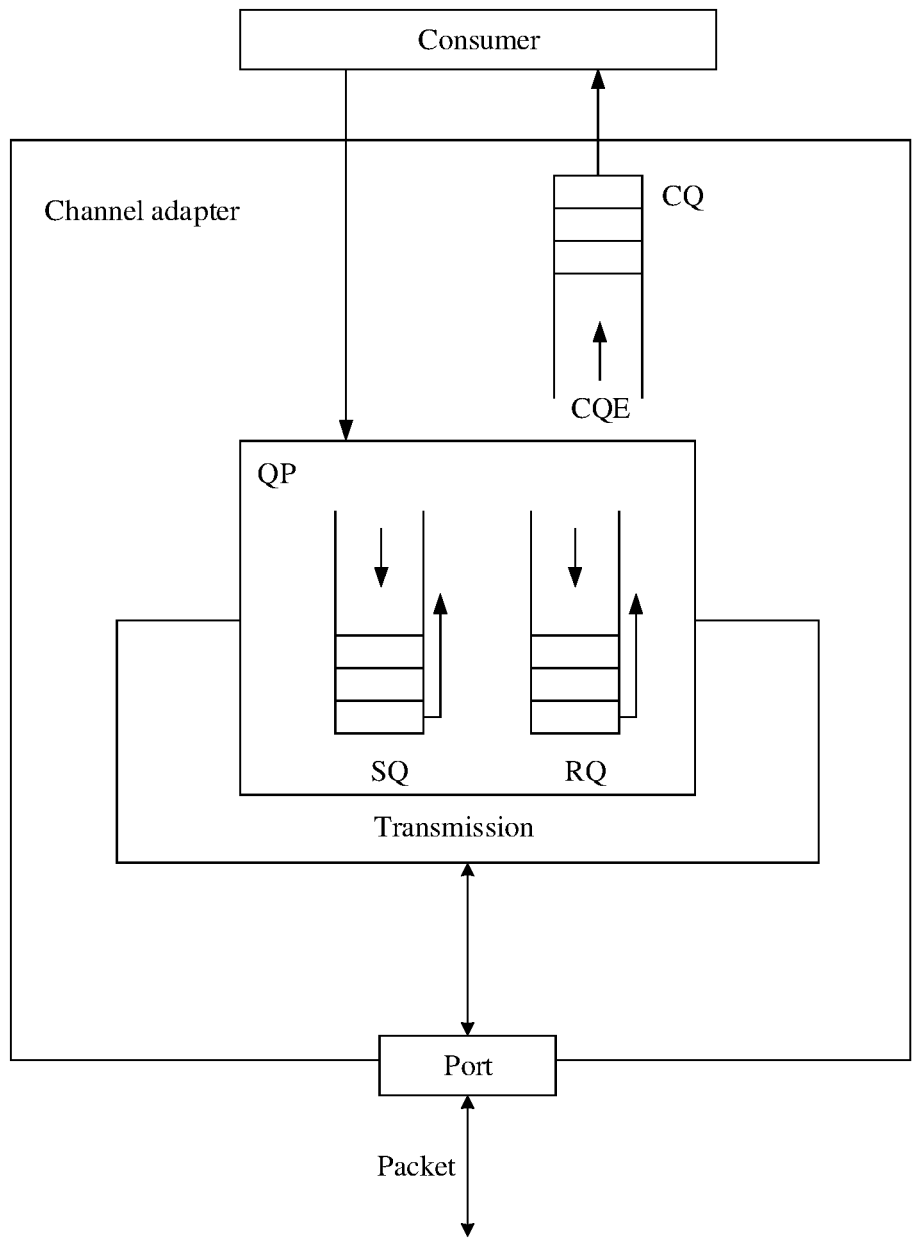
FIG. 3 is a schematic diagram of a QP according to an embodiment of the present disclosure.

As shown in FIG. 3, the RDMA is a transport layer network protocol, and a queue pair (QP) is used in a channel adapter (CA) to send and receive data (as a message) of a consumer. Each QP includes a send queue (SQ) and a receive queue (RQ). The SQ is responsible for sending a message, and the RQ is responsible for receiving a message. The SQ and the RQ of each QP may be separately associated with a completion queue (CQ). Each QP has its own connection context to maintain its connection status. The SQ, the RQ, and the CQ also have their own queue contexts to maintain their queue usage statuses.

The consumer in embodiments of the present disclosure refers to a subject that uses the QP to send and receive a message, and generally refers to a software process, for example, NoF protocol software.

When the message is sent, the consumer submits a (post) work request (WR), and a driver of the controller converts the WR into an SQ submission work queue element (WQE) in a QP of a current node (as a requester). The WQE includes an RDMA operation type, an address that points to a storage space of the to-be-transmitted message, and a size of the to-be-transmitted message. To-be-transmitted data is used as a message, and a length of the message ranges from 0 bytes to 4 GB bytes. The network interface card segments data to which the WQE points into packets based on a path maximum transmission unit (PMTU), and then sends the packets to the network. After completing transmission of all content of a message to which a WQE points, the network interface card submits a completion queue element (CQE) to a CQ associated with an SQ to notify the consumer that an RDMA operation indicated by the WQE submitted by the consumer is completed.

For receiving a send message, before receiving the message, the consumer submits a WQE to an RQ in a QP of a current node (as a responder) in advance. The WQE includes a pointer of a storage space capable of storing data and a size of the storage space capable of storing the data. The network interface card receives the data from the front-end fabric and writes the data to the storage space to which the WQE of the RQ points. After receiving the data, the network interface card submits a CQE to a CQ associated with the RQ to notify the consumer that the network interface card has received an RDMA message. For receiving an RDMA read response message, the network interface card writes received data into a storage space to which a WQE of a corresponding RDMA read operation points. For receiving a tail packet or a single packet of the RDMA read response message, after completing receiving the data, the network interface card submits a CQE to a CQ associated with an SQ to notify the consumer that the RDMA read operation indicated by the WQE submitted by the consumer has been completed. For an acknowledgment packet of receiving an RDMA write message or an RDMA send message, the network interface card submits a CQE to a CQ associated with an SQ to notify the consumer that an RDMA write operation or an RDMA send operation indicated by a WQE submitted by the consumer has been completed. For acknowledgment packets of the send message, RDMA read response message, and RDMA write message, refer to the following description.

Figure 4:
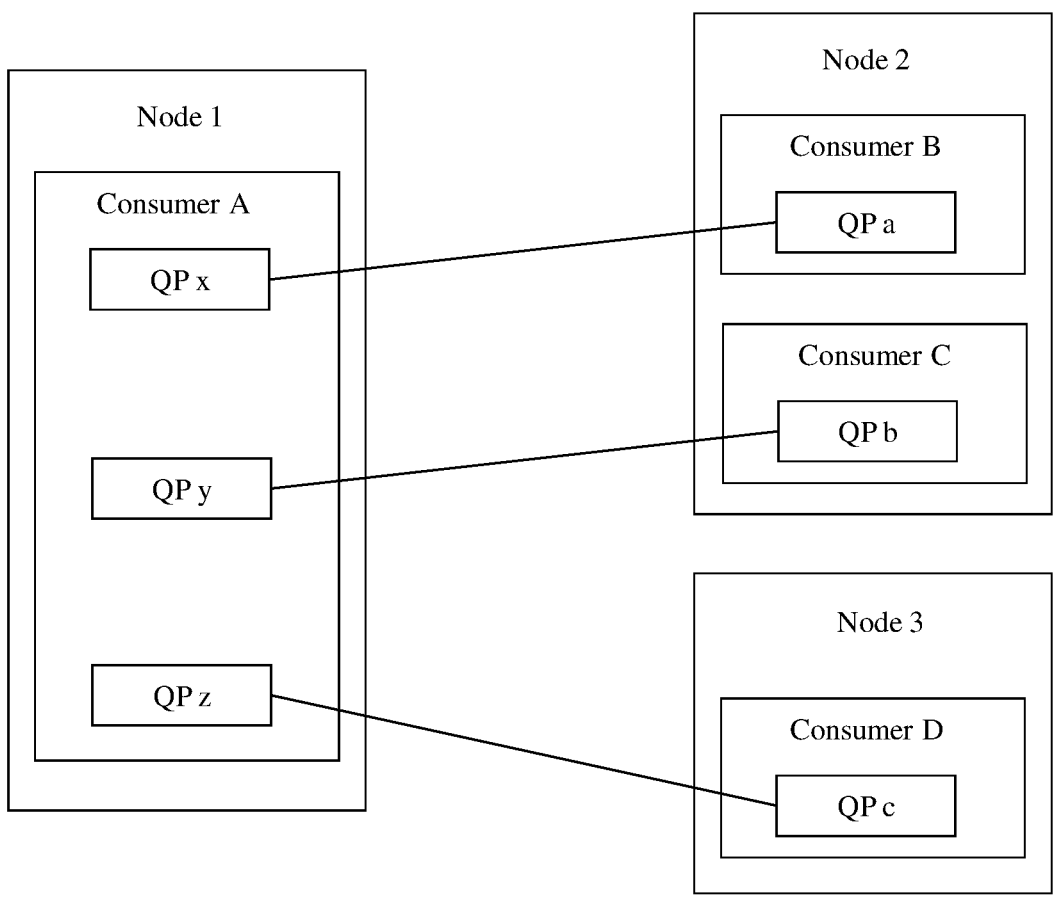
FIG. 4 is a schematic diagram of a reliable QP connection according to an embodiment of the present disclosure.

The RDMA supports a QP connection with a reliable connection and a QP connection with an unreliable connection. The QP connection with the reliable connection supports only a one-to-one communication model. To be specific, a QP on a node can establish a QP connection with only one QP on another node, and no QP can establish QP connections with a plurality of QPs of the another node at the same time. For example, as shown in FIG. 4, a QP connection is established between a QP x of a consumer A of a node 1 and a QP a of a consumer B of a node 2, and the QP connection cannot be established between the QP x of the consumer A of the node 1 and another QP (for example, a QP b or a QP c). NoF performs communication by using the RDMA that supports the QP connection with the reliable connection.

Figure 5:
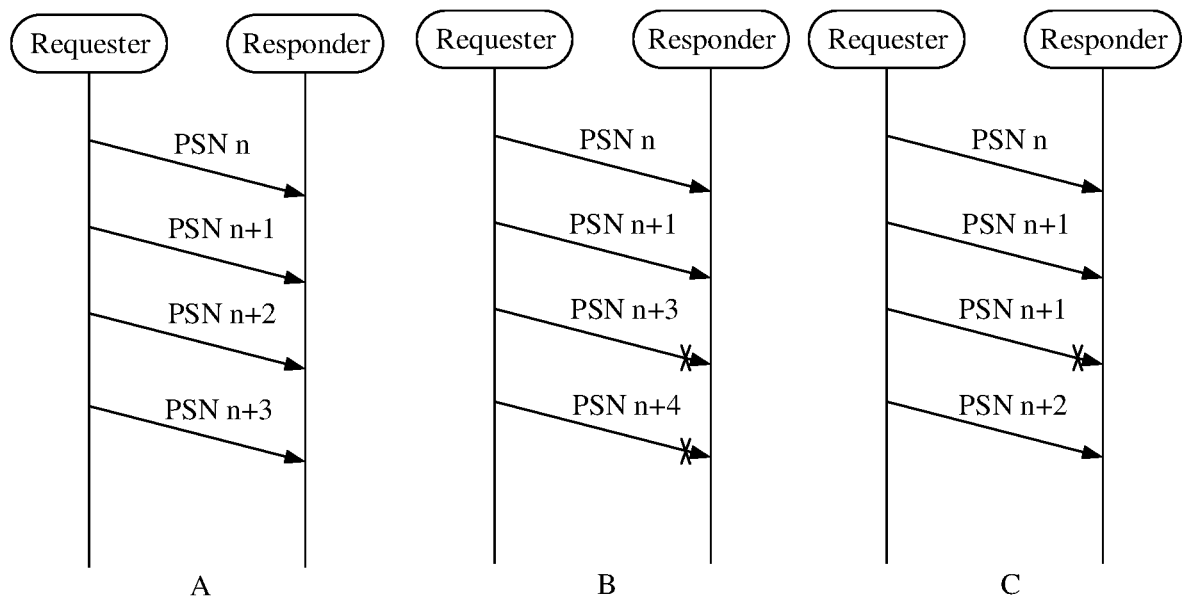
FIG. 5 is a schematic diagram of increasing an order-preserving PSN of an RDMA packet according to an embodiment of the present disclosure.

Packets that are of reliable QP connections and that are received in the RDMA should comply with a strict order-preserving requirement. The responder determines whether to receive the packets based on whether packet sequence numbers (PSNs) in the packets sequentially received increase strictly in a preserving order. As shown in A in FIG. 5, the responder receives packets only when PSNs of the packets strictly increase (for example, the PSNs of the packets are sequentially equal to n, n+1, n+2, and n+3). As shown in B in FIG. 5, when PSNs of packets jump (for example, the PSNs of the packets lack n+2), the responder discards all subsequent packets, of the QP, whose PSNs do not strictly increase. As shown in C in FIG. 5, when a PSN of a packet is the same as a PSN of a received packet (for example, a packet whose PSN is n+1 is repeatedly received), the responder discards the repeated packet.

Operations of message types supported by the RDMA include a send operation (send operation). The operation requires the processor and is applicable to a transmission control packet (or referred to as a command message).

Memory operations supported by the RDMA include the RDMA read operation and the RDMA write operation.

These operations do not require the processor, and data read or write is completed by operating a storage space by using the network interface card. This is applicable to a data transmission packet (or referred to as a data message).

The following separately describes the send operation, the RDMA read operation, and the RDMA write operation.

Send Operation

The send operation may also be referred to as a push operation or having channel semantics. The requester pushes data to the responder without knowing a location at which the data is stored in the responder. A channel adapter of the responder places the data in a next available storage space of a QP of the channel adapter. The storage space is indicated by a WQE in a header of an RQ of the QP.

The requester may initiate the send operation by sending a send message, where the message includes the data to be pushed to the responder. A length of the data may range from 0 bytes to $2^{31}$ (4 GB) bytes. If the length of the data is greater than the path maximum transmission unit (PMTU), the data is segmented into a plurality of packets based on a PMTU size, and the responder recombines the packets to obtain the data. For a reliable connection, if the data is a short message (that is, the data does not need to be segmented into the plurality of packets), the responder sends an acknowledgment (ACK) packet to the requester for each packet. If the data is a long message (that is, the data is segmented into the plurality of packets), the responder may send an acknowledgment (ACK) packet to the requester for each packet. Alternatively, one acknowledgment packet is sent to the requester for a plurality of consecutive packets of a same message, or an acknowledgment packet is sent to the requester for a tail packet of the message. In addition, regardless of whether the data is the short message or the long message, the responder may send one acknowledgment (ACK) packet of a plurality of previously received packets. For example, an acknowledgment packet of a send message with a PSN of X may be used to confirm that a message with a PSN smaller than X before the send message has been successfully received by the responder.

Each send message may include four-byte immediate data (immediate data, ImmDt). If the immediate data needs to be included, the immediate data is included in an additional header field (immediate extended transmission header or ImmDt field) of a last packet of the send message.

Figure 6A:
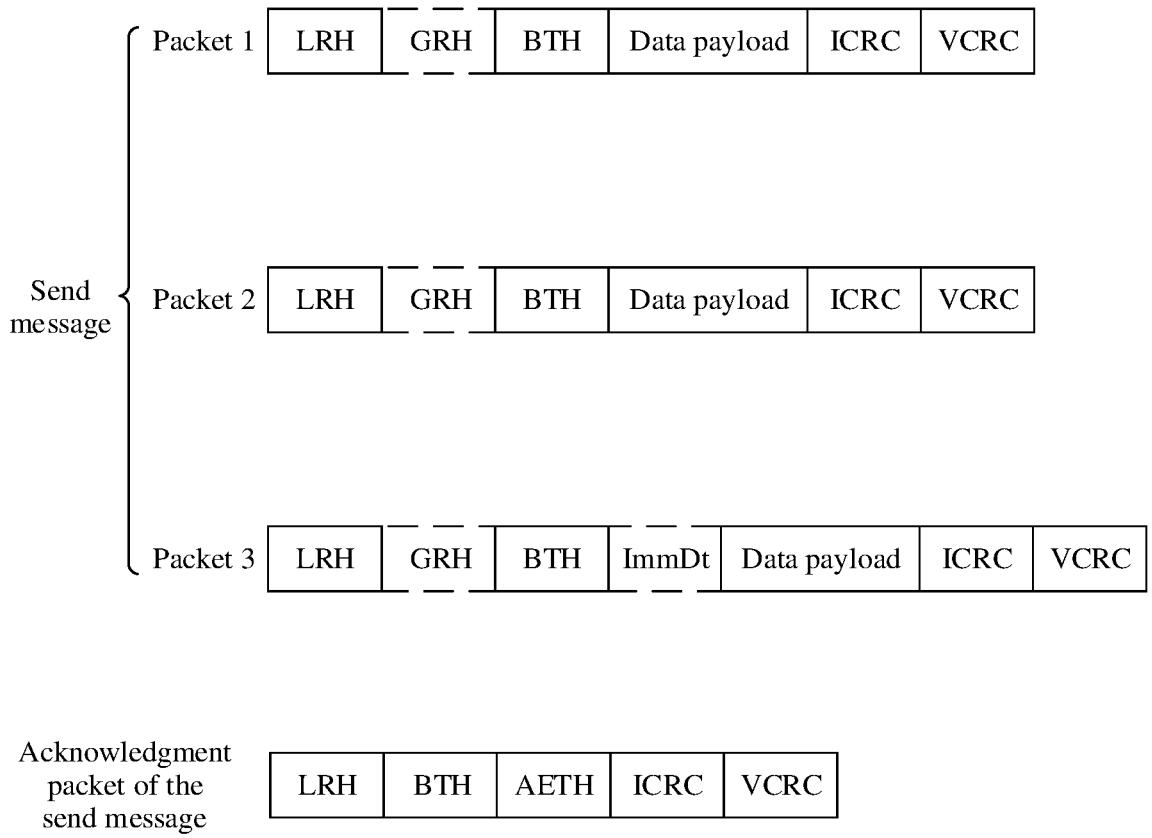
FIG. 6A is a schematic diagram of structures of an IB protocol-based send message and an acknowledgment packet of the send message according to an embodiment of the present disclosure.
Figure 6B:
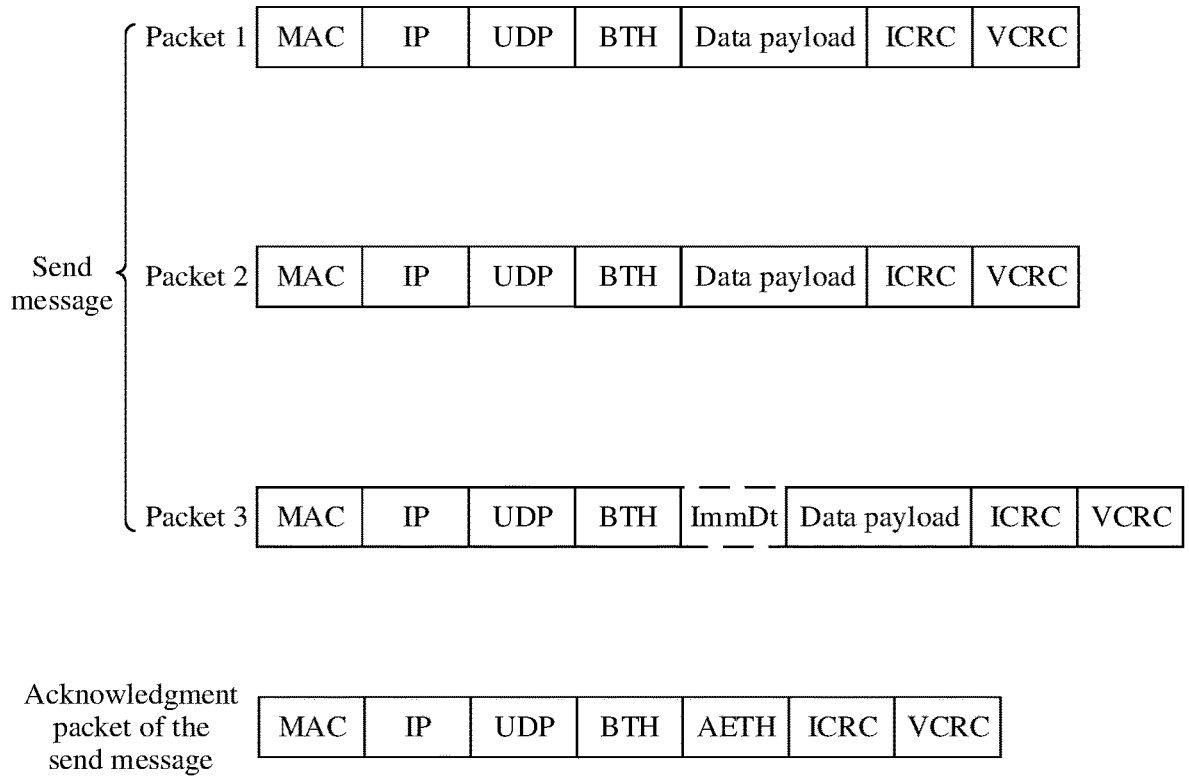
FIG. 6B is a schematic diagram of structures of an RoCEv2 protocol-based send message and an acknowledgment packet of the send message according to an embodiment of the present disclosure.
Figure 7:
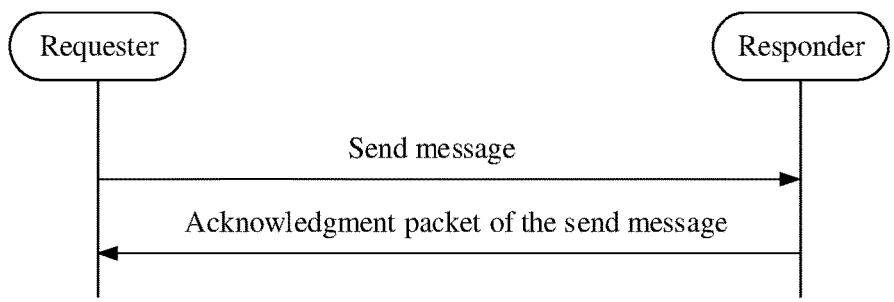
FIG. 7 is a schematic diagram of an interaction process between a requester and a responder that are of a reliable connection according to an embodiment of the present disclosure.

For example, it is assumed that a send message is segmented into three packets. Structures of an IB protocol-based send message and an acknowledgment packet of the send message are shown in FIG. 6A, and structures of an RoCEv2 protocol-based send message and an acknowledgment packet of the send message are shown in FIG. 6B. An interaction process between a requester and a responder that are of a reliable connection is shown in FIG. 7.

A local route header (LRH) field is used to perform routing by using a switch in a subnet.

A global route header (GRH) field is used to route to a destination outside a local subnet of a sender.

An invariant CRC (ICRC) field covers all fields that should not be changed in a packet, and CRC check is performed on the fields.

A variant CRC (VCRC) field covers all fields of a packet, and CRC check is performed on the fields.

An acknowledgment extension transport header (ACK extended transport header, AETH) includes an additional transport field of an acknowledgment packet, which is included in each acknowledgment packet of the send message.

A media access control (MAC) field is used to perform layer 2 forwarding by using a switch in an Ethernet subnet.

An Internet protocol (IP) field is used to perform layer 3 forwarding by using a switch.

A user datagram protocol (UDP) field indicates that a payload of a packet is an RDMA message.

A base transport header (BTH) field indicates a destination QP, operation code, a packet sequence number (PSN), and a partition. An operation code field (OpCode field) in the BTH field determines a start and an end of the send message.

For the send message, if a length of data is less than or equal to a PMTU, BTH operation code "SEND Only" or "SEND Only with Immediate" is used, indicating that the message cannot be split (that is, a single packet).

If a length of data is zero, BTH operation code "SEND Only" or "SEND Only with Immediate" is used, and there is no data payload field in the message. For a send message whose BTH operation code is "SEND Only", another field is shown in a packet 1 in FIG. 6A or FIG. 6B. For a send message whose BTH operation code is "SEND Only with Immediate", another field is shown in a packet 3 in FIG. 6A or FIG. 6B.

If a length of data is greater than PMTU, BTH operation code of a first packet is "SEND First", indicating that the packet is an initial packet; BTH operation code of a middle packet is "SEND Middle", indicating that the packet is an intermediate packet; and BTH operation code of a last packet is "SEND Last" or "SEND Last with Immediate", indicating that the packet is a tail packet.

For an acknowledgment packet of the send message, BTH operation code is "Acknowledge".

For a given QP of the requester, once a multi-packet send operation is started, no other send message, RDMA write message, or RDMA read request message can be sent before the packet with the operation code "SEND Last" or "SEND Last with Immediate".

The responder does not know a final length of the data until the last packet with the operation code "SEND Last" or "SEND Last with Immediate" arrives.

It should be noted that, after completing receiving the single packet or the tail packet of the send message, the responder reports a CQE to a CQ associated with an RQ of a current node. After completing a sending process of the send operation (receiving an acknowledgment packet corresponding to the single packet or tail packet of the send message), the requester submits a CQE to a CQ associated with an SQ of the current node.

RDMA Write Operation

The RDMA write operation is used by the requester to write data to a storage space of the responder.

Before the requester is allowed to perform the RDMA write operation, the responder first allocates the storage space for a QP (or a QP group) of the responder to access. A channel adapter of the responder associates a 32-bit M_Key key with a virtual address of the storage space. The responder sends the virtual address of the storage space, a length, and the M_Key key to the requester that can access the memory area. For example, the foregoing information may be sent to the requester by using the send operation described above.

The requester may initiate the RDMA write operation by sending an RDMA write message. The message includes the data to be written to the responder, the virtual address of the storage space of the responder, the length of the data, and the M_Key key. The length of the data may range from 0 bytes to $2^{31}$ (4 GB) bytes. Similar to the send operation, if the length of the data is greater than a PMTU, the data is segmented into a plurality of packets based on a PMTU size, and the responder recombines the packets to obtain the data. For a reliable connection, if the data is a short message (that is, the data does not need to be segmented into the plurality of packets), the responder sends an acknowledgment (ACK) packet to the requester for each packet. If the data is a long message (that is, the data is segmented into the plurality of packets), the responder may send an acknowledgment (ACK) packet to the requester for each packet. Alternatively, one acknowledgment packet is sent to the requester for a plurality of consecutive packets of same data, or an acknowledgment packet is sent to the requester for a tail packet. In addition, regardless of whether the data is the short message or the long message, the responder may send one acknowledgment (ACK) packet of a plurality of previously received packets. For example, an acknowledgment packet of an RDMA write message with a PSN of X may be used to confirm that a message with a PSN smaller than X before the RDMA write message has been successfully received by the responder.

Figure 8A:
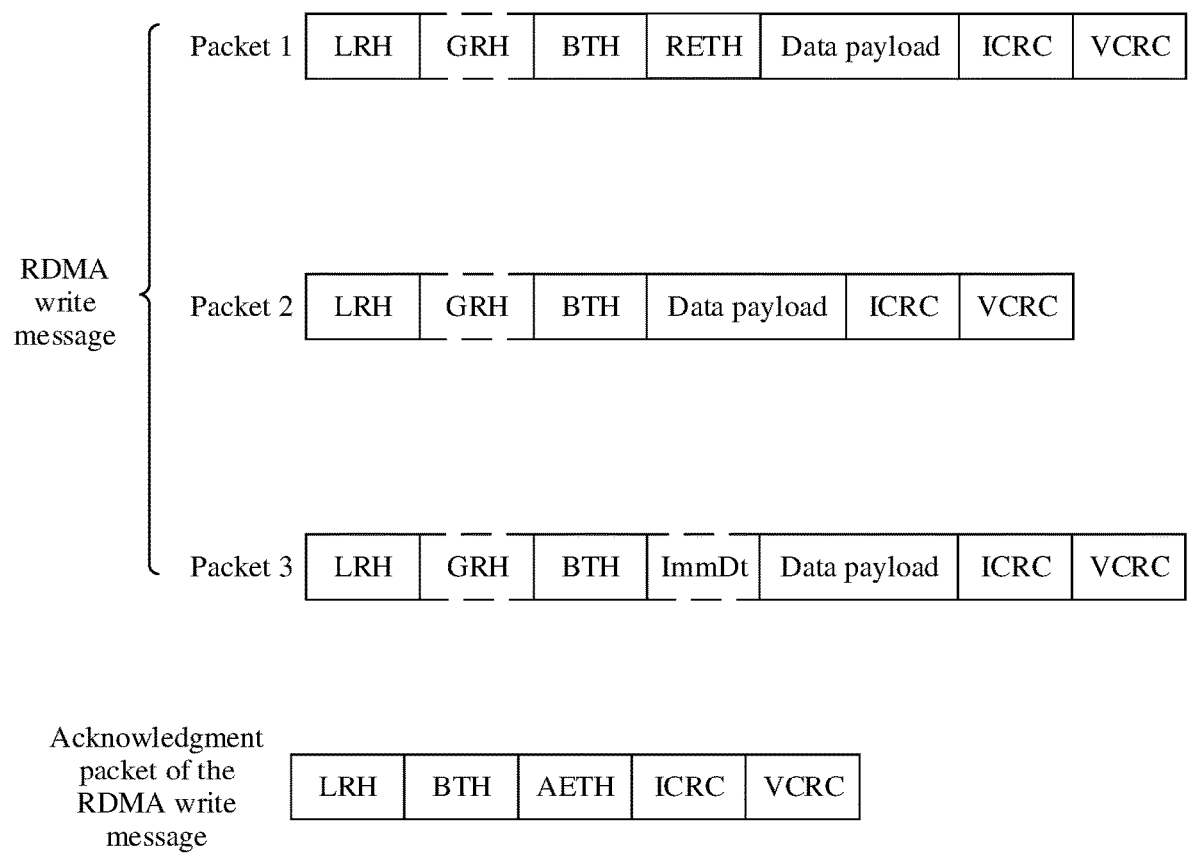
FIG. 8A is a schematic diagram of structures of an IB protocol-based RDMA write message and an acknowledgment packet of the RDMA write message according to an embodiment of the present disclosure.
Figure 8B:
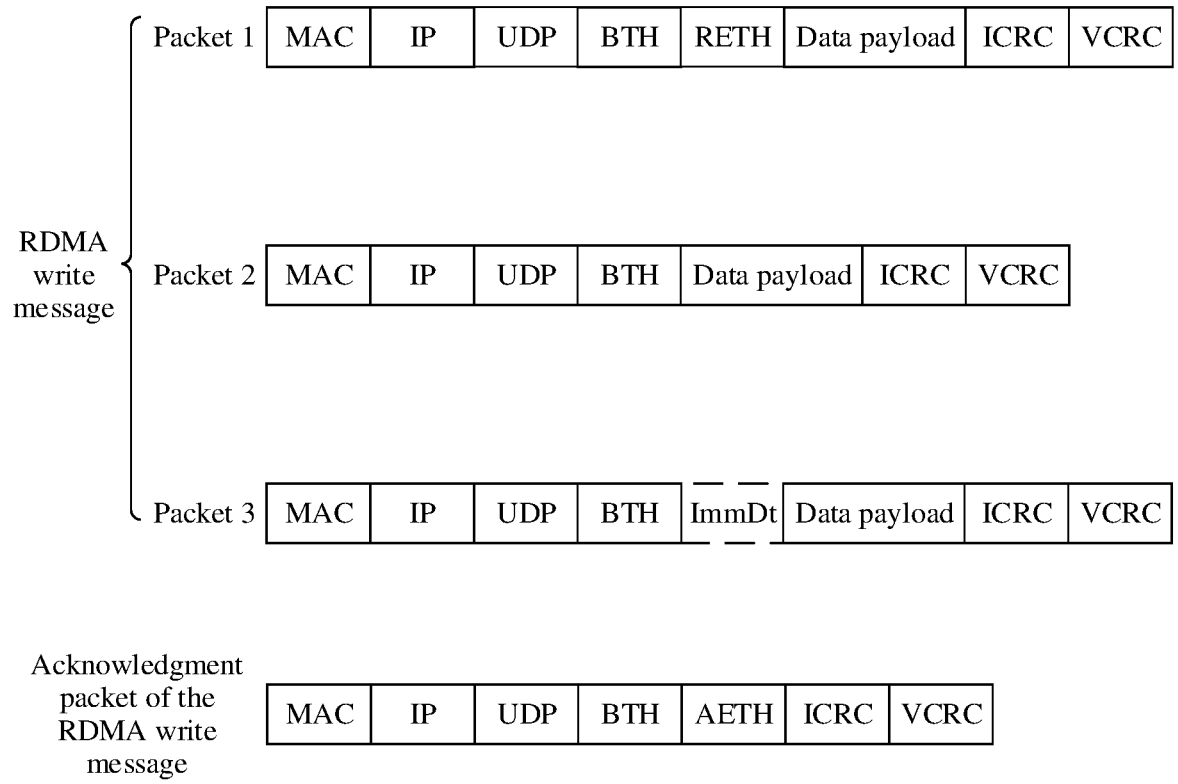
FIG. 8B is a schematic diagram of structures of an RoCEv2 protocol-based RDMA write message and an acknowledgment packet of the RDMA write message according to an embodiment of the present disclosure.
Figure 9:
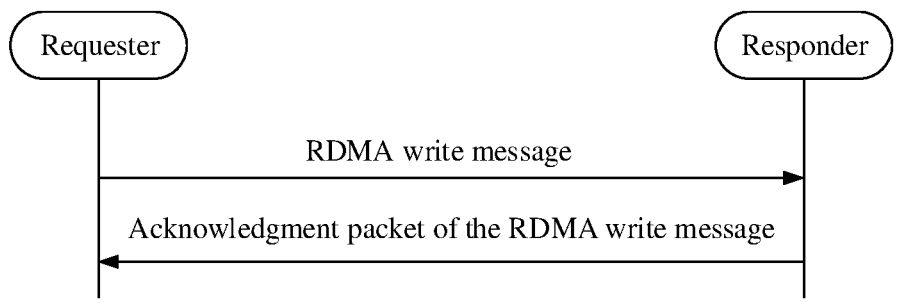
FIG. 9 is a schematic diagram of another interaction process between a requester and a responder that are of a reliable connection according to an embodiment of the present disclosure.

For example, it is assumed that an RDMA write message is segmented into three packets. Structures of an IB protocol-based RDMA write message and an acknowledgment packet of the RDMA write message are shown in FIG. 8A, and structures of an RoCEv2 protocol-based RDMA write message and an acknowledgment packet of the RDMA write message are shown in FIG. 8B. FIG. 9 shows an interaction process between a requester and a responder that are of a reliable connection according to an embodiment of the present disclosure.

An RDMA extended transmission header (RETH) includes an additional transmission field of the RDMA operation. For example, the virtual address of the target storage space, the length of the data of the RDMA operation, and the M_Key key are included. The responder determines, based on the M_Key key, that the requester has permission to access the corresponding virtual address, and stores the data indicated by the length into the storage space to which the virtual address points.

Similar to the send operation, an operation code field (OpCode field) in a BTH field determines a start and an end of the RDMA write message.

For the RDMA write message, if a length of data is less than or equal to a PMTU, BTH operation code "RDMA WRITE Only" or "RDMA WRITE Only with Immediate" is used, indicating that the message is not split (that is, a single packet).

If a length of data is zero, BTH operation code "RDMA WRITE Only" or "RDMA WRITE Only with Immediate" is used, and there is no data payload field in the packet. For an RDMA write message whose BTH operation code is "RDMA WRITE Only", another field is shown in a packet 1 in FIG. 8A or FIG. 8B. For an RDMA write message whose BTH operation code is "RDMA WRITE Only with Immediate", an ImmDt field is added after an RETH field of the packet 1 in FIG. 8A or FIG. 8B, and another field is shown in the packet 1.

If a length of data is greater than a PMTU, BTH operation code of a first packet is "RDMA WRITE First", indicating that the packet is an initial packet; BTH operation code of a middle packet is "RDMA WRITE Middle", indicating that the packet is an intermediate packet; and BTH operation code of a last packet is "RDMA WRITE Last" or "RDMA WRITE Last with Immediate", indicating that the packet is a tail packet.

For an acknowledgment packet of the RDMA write message, BTH operation code is "Acknowledge".

RDMA Read Operation

The RDMA read operation is a reverse operation of the RDMA write operation, and is used by the requester to read data in a storage space of the responder.

Before allowing the requester to perform the RDMA read operation, the responder first allows the requester to access a virtual address of the responder, that is, sends, to the requester, a virtual address and a length that are of the data to be read by the RDMA read operation, and an M_Key key. For example, the foregoing information may be sent to the requester by using the send operation described above.

The requester may initiate the RDMA read operation by sending an RDMA read request message. The message includes the virtual address of the storage space of the responder, the length of the data of the RDMA operation, and the M_Key key. The responder sends an RDMA read response message to the requester, where the message includes the read data. The length of the to-be-read data may range from 0 bytes to $2^{31}$ (4 GB) bytes. If the length is greater than a PMTU, the to-be-read data is segmented, based on a PMTU size, into a plurality of packets to be transmitted by using packets of a plurality of RDMA read response messages, and the requester recombines the packets to obtain the data. For a reliable connection, the RDMA read response message does not have a corresponding acknowledgment packet. If detecting that the packet of the RDMA read response message is lost, the requester initiates the RDMA read operation again.

Figure 10A:
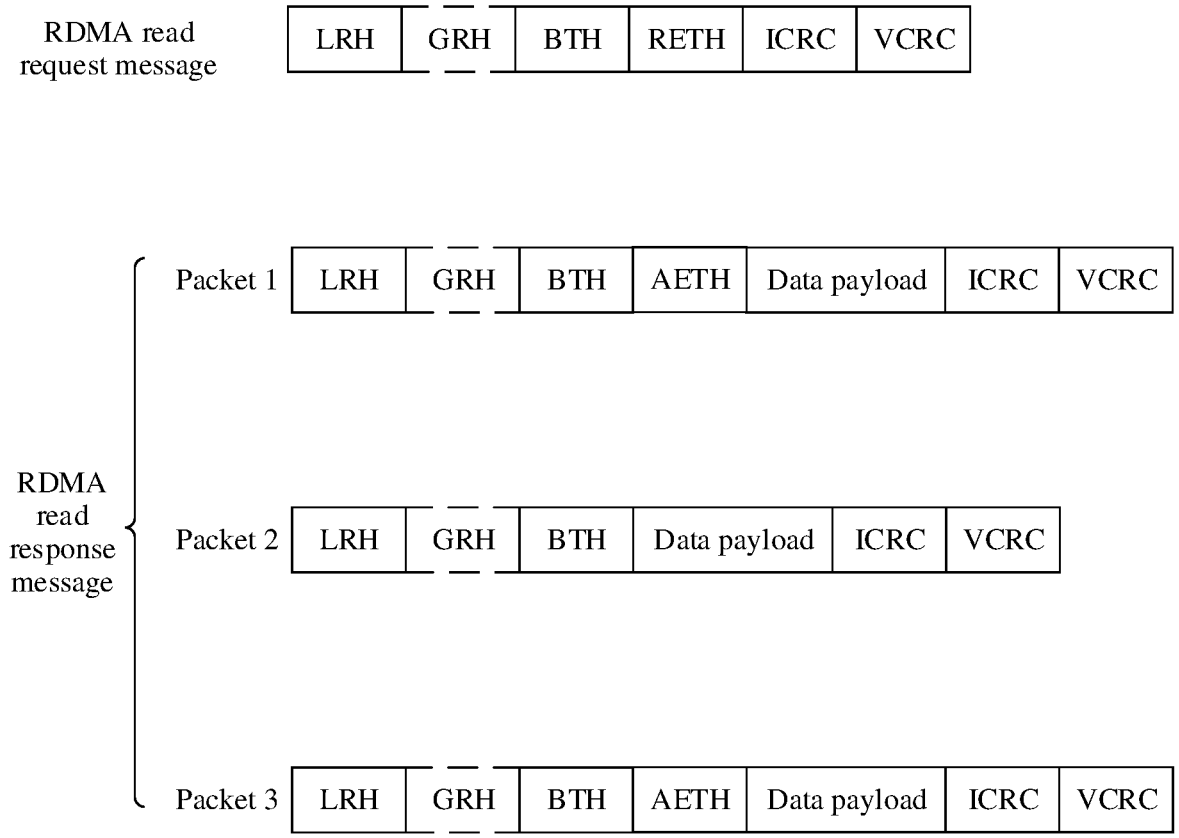
FIG. 10A is a schematic diagram of structures of an IB protocol-based RDMA read request message and an IB protocol-based RDMA read response message according to an embodiment of the present disclosure.
Figure 10B:
FIG. 10B is a schematic diagram of structures of an RoCEv2 protocol-based RDMA read request message and an RoCEv2 protocol-based RDMA read response message according to an embodiment of the present disclosure.
Figure 10B:
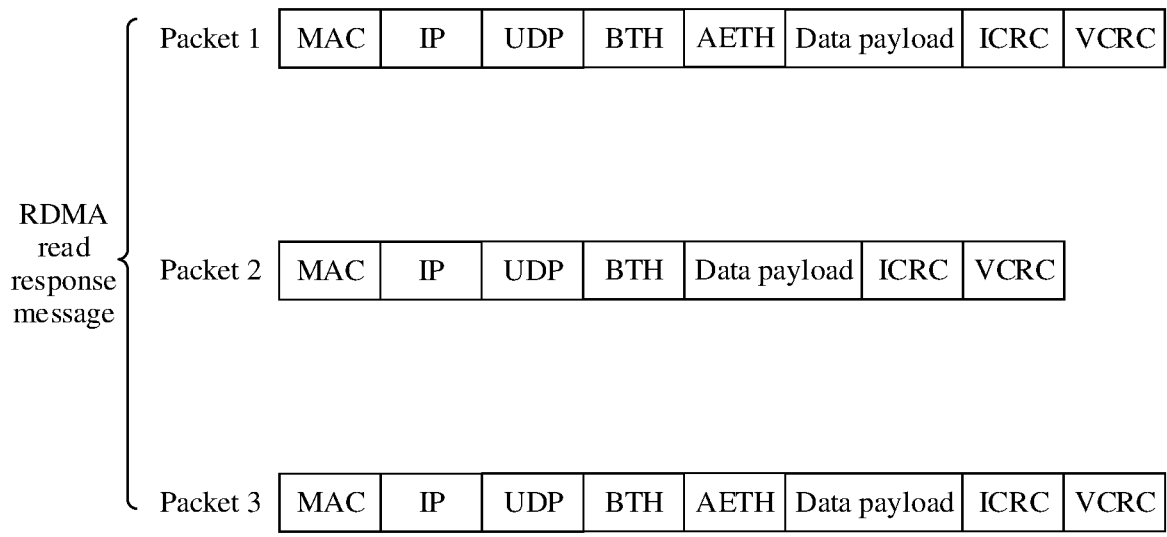
Figure 11:
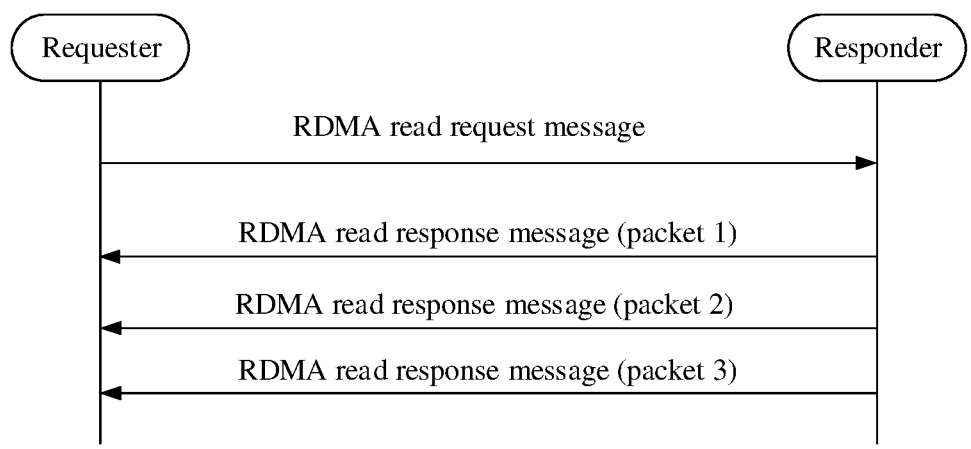
FIG. 11 is a schematic diagram of still another interaction process between a requester and a responder that are of a reliable connection according to an embodiment of the present disclosure.

For example, it is assumed that the RDMA read response message is segmented into three packets. Structures of an IB protocol-based RDMA read request message and an IB protocol-based RDMA read response message are shown in FIG. 10A, and structures of an RoCEv2 protocol-based RDMA read request message and an RoCEv2 protocol-based RDMA read response message are shown in FIG. 10B. FIG. 11 shows an interaction process between a requester and a responder that are of a reliable connection according to an embodiment of the present disclosure.

An operation code field (OpCode field) in a BTH field determines a start and an end of a message (the RDMA read request message or the RDMA read response message).

For the RDMA read request message, BTH operation code is "RDMAREAD Request".

For the RDMA read response message, if a length of data is less than or equal to the PMTU, BTH operation code "RDMA READ Response Only" is used, indicating that the message cannot be split (that is, a single packet).

If the length of the data is zero, the BTH operation code "RDMA READ Response Only" is used, and there is no data payload field in the RDMA read response message. All other fields are shown in a packet 1 in FIG. 10A or FIG. 10B.

If the length of the data is greater than the PMTU, BTH operation code of a first packet is "RDMA READ Response First", indicating that the packet is an initial packet; BTH operation code of a middle packet is "RDMA READ Response Middle", indicating that the packet is an intermediate packet; and BTH operation code of a last packet is "RDMA READ Response Last", indicating that the packet is a tail packet.

Figure 12:
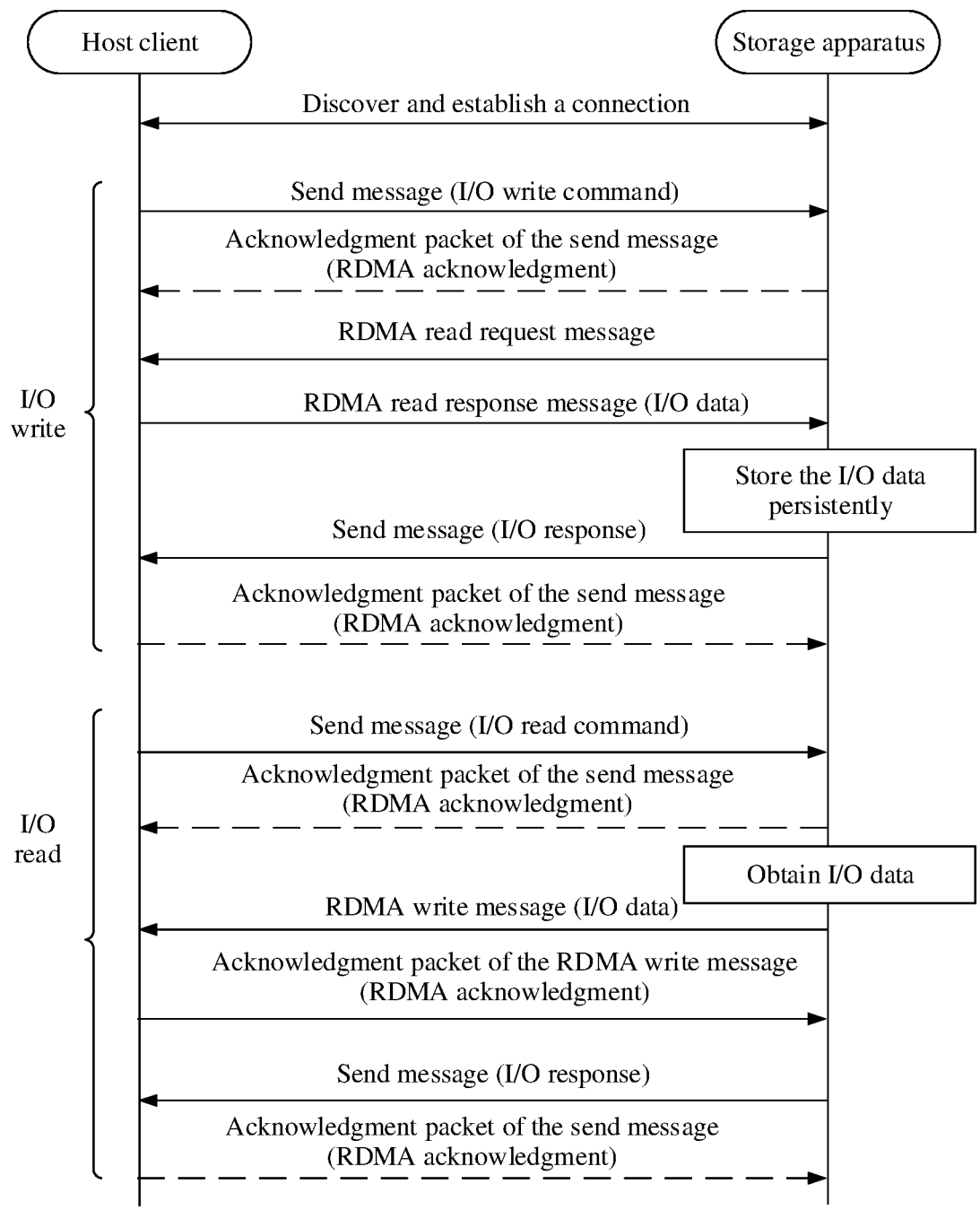
FIG. 12 is a schematic diagram of a process in which a host client and a storage apparatus complete an I/O read/write operation by using an RDMA operation according to an embodiment of the present disclosure.

A process in which a host client and a storage apparatus complete I/O read/write by using the RDMA operation is shown in FIG. 12.

The host client first discovers the storage apparatus in a network and establishes a connection to the storage apparatus.

In a process in which the host client performs I/O write to the storage apparatus, the host client sends a send message to the storage apparatus, and data payload of the packet is an I/O write command. For a reliable connection, the storage apparatus may send an acknowledgment packet of the send message to the host client to indicate that the I/O write command is received. The storage apparatus (used as a requester) sends an RDMA read request message to the host client (used as a responder), and the host client sends an RDMA read response message to the storage apparatus, where data payload of the packet is I/O data. After persistently storing the I/O data, that is, after storing the I/O data in a storage medium such as a hard disk drive (HDD) or a solid state drive (SSD), the storage apparatus sends a send message to the host client. The packet includes an I/O response, indicating that the I/O write process is completed, and the host client sends an acknowledgment packet of the send message to the storage apparatus to indicate that the I/O response is received.

In a process in which the host client performs I/O read to the storage apparatus, the host client sends a send message to the storage apparatus, and data payload of the packet is an I/O read command. For a reliable connection, the storage apparatus may send an acknowledgment packet of the send message to the host client to indicate that the I/O read command is received. After the storage apparatus obtains I/O data, that is, after the storage apparatus obtains the I/O data from the storage medium such as an HDD or an SSD, the storage apparatus (used as a requester) sends an RDMA write message to the host client (used as a responder), and data payload of the packet is the I/O data. The host client sends an acknowledgment packet of the RDMA write message to the storage apparatus. The storage apparatus sends a send message to the host client. The packet includes an I/O response, indicating that the I/O read process is completed, and the host client sends an acknowledgment packet of the send message to the storage apparatus to indicate that the I/O response is received.

It can be learned that in the complete I/O write process, command messages (such as a command request and a command response) are transmitted through the send operation, and data messages are transmitted through the RDMA read operation. In the complete I/O read process, command messages are transmitted through the send operation, and data messages are transmitted through the RDMA write operation.

As described above, in the RDMA read operation, the host client serves as the requester to send the I/O read command to the storage apparatus, the storage apparatus serves as the responder to receive the I/O read command, and an NIC of the storage apparatus distributes the I/O read command to different controllers for parallel processing. Each controller sends I/O data and an I/O response to the host client by using the NIC.

Each controller 111 corresponds to one QP, each QP includes one SQ, and the SQ includes a WQE. When a controller has a message (I/O data or an I/O response) to be sent, the controller adds one or more WQEs to an SQ of a corresponding QP, where the WQE points to a storage space of the to-be-transmitted message. If a size of the to-be-transmitted message is large, the message is split into a plurality of WQEs. Therefore, the message needs to be scheduled for a plurality of times before being transmitted. In addition, the controller generates a doorbell (DB) signal and sends the doorbell (DB) signal to the NIC. The DB signal indicates that a message is to be sent in a storage space to which at least one WQE of an SQ corresponding to the controller points.

The NIC aggregates doorbell signals from controllers, and does not directly trigger sending of a message. Instead, the NIC first filters DBs of a same SQ, finally retains only one DB for each SQ, and selects, based on a preset rule, one doorbell signal from the DBs to respond. A specific preset rule is not limited in the present disclosure. For example, the NIC may poll all the controllers in manners such as round robin (RR), weighted round robin (WRR), or dynamic weighted round robin (DWRR).

Figure 13:
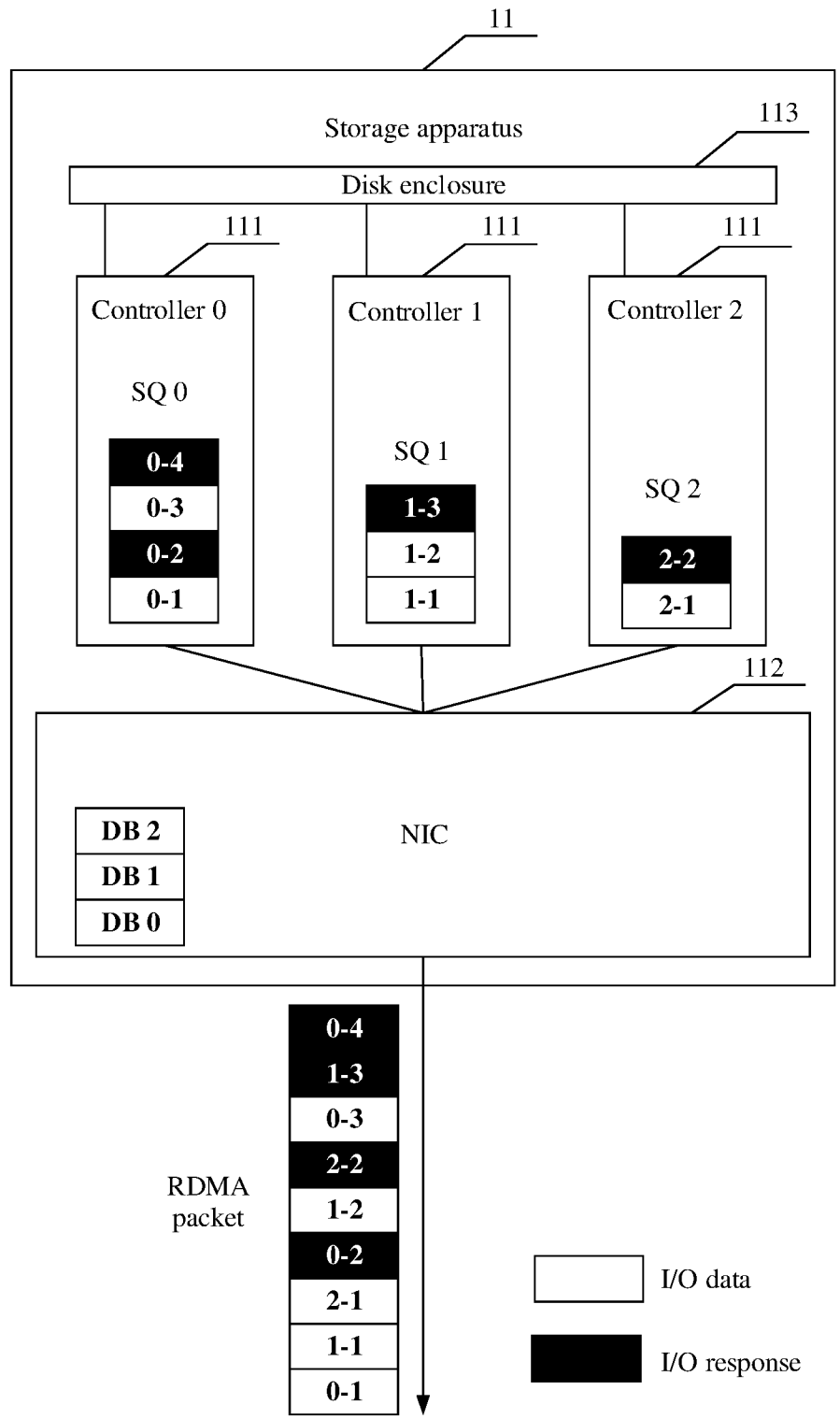
FIG. 13 is a schematic diagram of a delay of an RDMA read operation according to an embodiment of the present disclosure.

For example, as shown in FIG. 13, it is assumed that an SQ 0 of a controller 0 has four WQEs (that is, messages in four storage spaces are to be transmitted). A depth that the NIC has for a doorbell signal DB 0 of the SQ 0 is 4. An SQ 1 of a controller 1 has three WQEs (that is, messages in three storage spaces are to be transmitted). A depth that the NIC has for a doorbell signal DB 0 of the SQ 1 is 3. An SQ 2 of a controller 2 has two WQEs (that is, messages in two storage spaces are to be transmitted). A depth that the NIC has for a doorbell signal DB 2 of the SQ2 is 2.

According to an RR principle, in a first round of scheduling, the NIC sequentially schedules WQEs of the controller 0, the controller 1, and the controller 2, and sends messages 0-1, 1-1, and 2-1 in storage spaces to which the corresponding WQEs point. In this case, the depth of the DB 0 changes to 3, the depth of the DB 1 changes to 2, and the depth of the DB 2 changes to 1.

In a second round of scheduling, the NIC sequentially schedules the WQEs of the controller 0, the controller 1, and the controller 2, and sends messages 0-2, 1-2, and 2-2 in the storage spaces to which the corresponding WQEs point. In this case, the depth of the DB 0 changes to 2, the depth of the DB 1 changes to 1, and the depth of DB2 changes to 0.

Because the depth of the DB 2 is 0, it indicates that no message needs to be sent. Therefore, in a third round of scheduling, the NIC sequentially schedules the WQEs of the controller 0 and the controller 1, and sends messages 0-3 and 1-3 in the storage spaces to which the corresponding WQEs point. In this case, the depth of the DB 0 changes to 1, and the depth of DB 1 changes to 0.

Because the depth of the DB 1 is 0, it indicates that no message needs to be sent. Therefore, in a fourth round of scheduling, the NIC schedules the WQE of the controller 0, and sends a message 0-4 in the storage space to which the corresponding WQE points. In this case, the depth of the DB 0 changes to 0, indicating that no message needs to be sent.

In the foregoing round robin manner, because I/O data and an I/O response of a same controller are not transmitted in one round of scheduling, the I/O response can be sent only after a next round of scheduling. For example, in FIG. 13, the I/O data 1-1 of the SQ 1 and the I/O data 2-1 of the SQ 2 are separated between the I/O data 0-1 of the SQ 0 and the I/O response 0-2. The host client can determine that the RDMA read operation is completed only after receiving the I/O response. Therefore, a delay of the RDMA read operation is increased, and system performance deteriorates.

Figure 14:
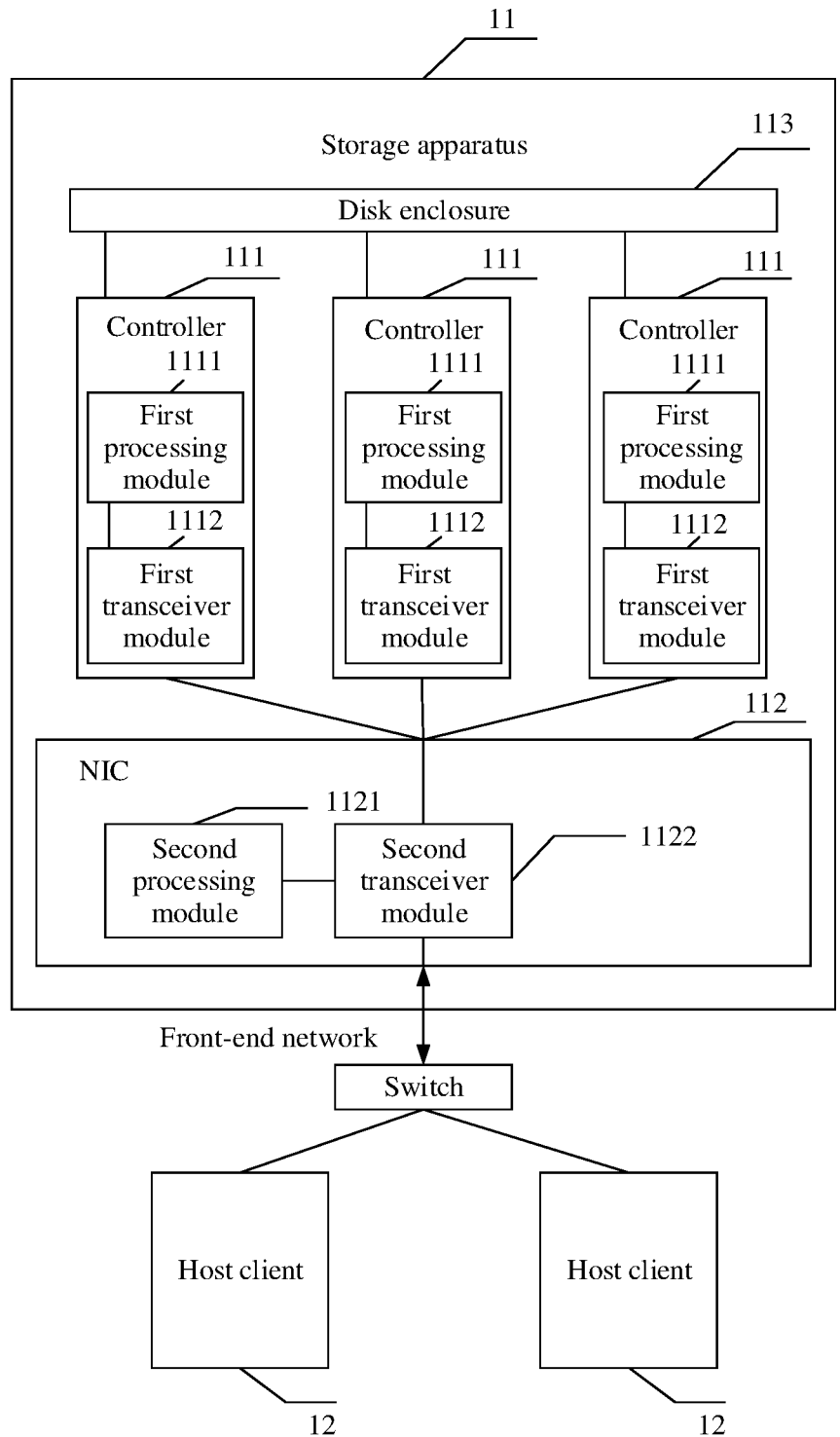
FIG. 14 is a schematic diagram of an architecture of another storage system according to an embodiment of the present disclosure.
Figure 15:
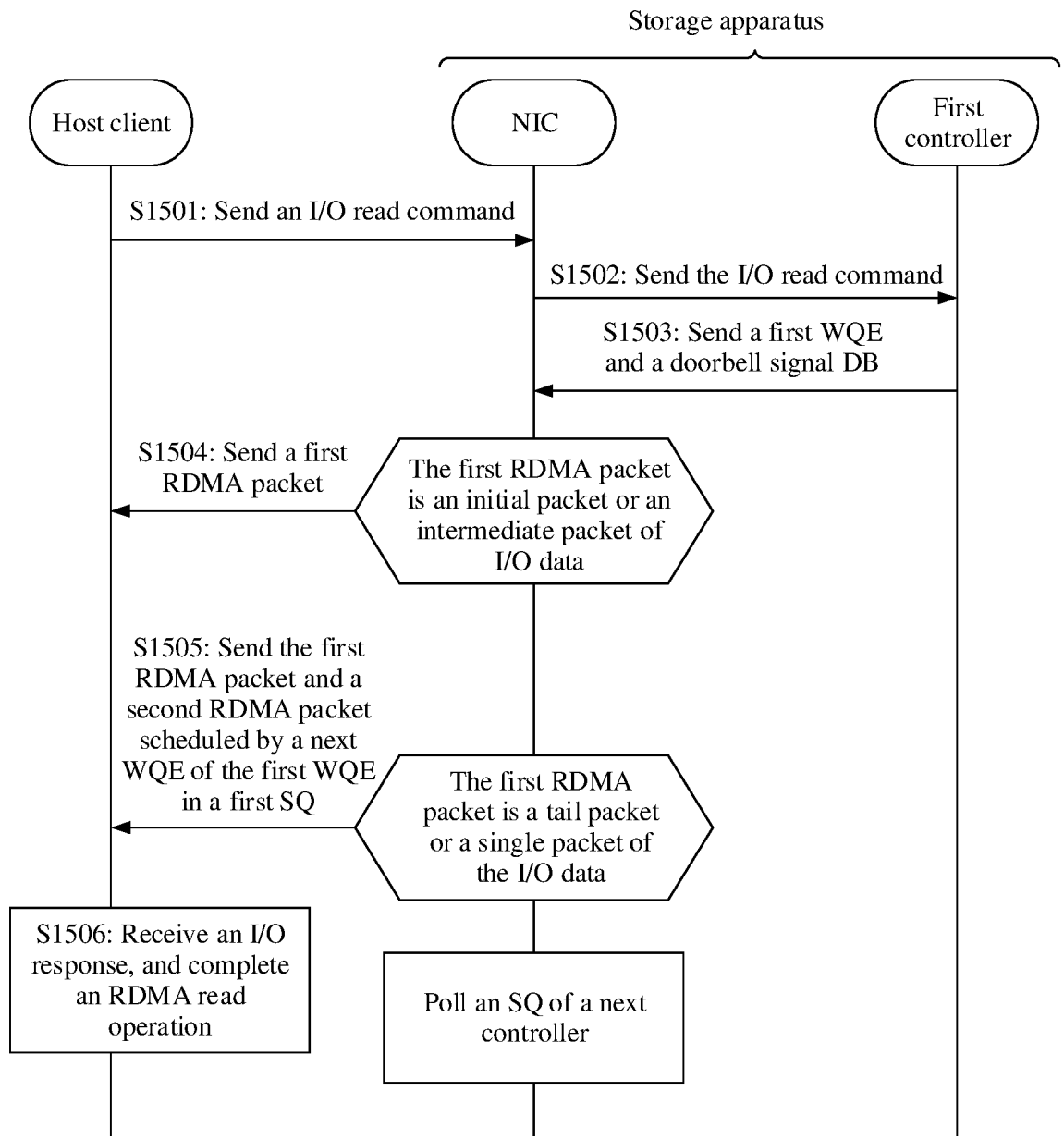
FIG. 15 is a schematic flowchart of a packet sending method according to an embodiment of the present disclosure.

An embodiment of the present disclosure provides a storage apparatus. As shown in FIG. 14, based on the storage apparatus shown in FIG. 1, the controller 111 of the storage apparatus 11 includes a first processing module 1111 and a first transceiver module 1112, and the NIC 112 of the storage apparatus 11 includes a second processing module 1121 and a second transceiver module 1122. For other content, refer to related description in FIG. 1. Details are not described herein again. The storage apparatus 11 is configured to perform the packet sending method shown in FIG. 15. Specifically, the packet sending method includes the following steps.

S1501: The host client 12 sends an I/O read command to the storage apparatus 11.

Correspondingly, the storage apparatus 11 receives the I/O read command from the host client 12. The I/O read command is used to request I/O data, and may be specifically executed by the second transceiver module 1122 of the NIC 112.

S1502: The NIC 112 of the storage apparatus 11 distributes the I/O read command to a first controller 111 in the plurality of controllers 111.

Correspondingly, the first controller 111 of the storage apparatus 11 receives the I/O read command from the NIC 112.

Specifically, the second transceiver module 1122 of the NIC 112 of the storage apparatus 11 may distribute the I/O read command to the first controller 111 according to a load balancing principle to implement parallel processing. Correspondingly, the first transceiver module 1112 of the first controller 111 receives the I/O read command from the NIC 112. For example, if the first controller is processing two I/O read commands, and a second controller is processing three I/O read commands, the NIC 112 may distribute a new I/O read command to the first controller that is processing the two I/O read commands.

S1503: The first controller 111 submits a first WQE to a first SQ of the first controller 111 based on the I/O read command, and sends a doorbell signal DB to the NIC 112.

Specifically, the first processing module 1111 of the first controller 111 submits the first WQE to the first send queue SQ based on the I/O read command, and the first transceiver module 1112 of the first controller 111 sends the doorbell signal DB to the NIC 112. The doorbell signal indicates that a message is to be sent in a storage space to which at least one WQE in the first SQ of the first controller 111 points.

The first processing module 1111 may search, based on the I/O read command, a storage medium for the I/O data requested by the host client, segment the I/O data based on a size of to-be-sent I/O data, and submit the first WQE to the first SQ. I/O data whose length is greater than a PMTU is segmented into three types of RDMA packets: an initial packet, an intermediate packet, and a tail packet. I/O data whose length is less than or equal to the PMTU is not segmented.

Correspondingly, the NIC 112 receives the doorbell signal DB from the first controller 111, and when polling the first controller 111, obtains, in response to the doorbell signal DB of the first controller 111, the first WQE from the first SQ corresponding to the first controller.

Specifically, the second transceiver module 1122 of the NIC 112 receives the doorbell signal DB from the first controller 111, and when polling the first controller 111, the second processing module 1121 of the NIC 112 obtains the first WQE from the first SQ.

The first WQE includes indication information, and the indication information indicates a type of a first RDMA packet scheduled by the first WQE. The type of the first RDMA packet may include an initial packet, an intermediate packet, a tail packet, or a single packet of I/O data.

In this embodiment, an RDMA message is segmented to obtain a plurality of RDMA packets. The initial packet is a first RDMA packet in the plurality of RDMA packets, the tail packet is a last RDMA packet in the plurality of RDMA packets, the intermediate packet is another RDMA packet in the plurality of RDMA packets. The single packet is an RDMA packet in which the RDMA message is not segmented. In other words, the RDMA packet is a complete RDMA message.

For example, the initial packet indicates that BTH operation code of an RDMA packet is "SEND First", "RDMA WRITE First", "RDMA READ Response First", or the like.

The intermediate packet indicates that BTH operation code of an RDMA packet is "SEND Middle", "RDMA WRITE Middle", "RDMA READ Response First", or the like.

The tail packet indicates that BTH operation code of an RDMA packet is "SEND Last", "SEND Last with Immediate", "RDMA WRITE Last", "RDMA WRITE Last with Immediate", "RDMA READ Response Last", or the like.

The single packet indicates that BTH operation code of an RDMA packet is "SEND Only", "SEND Only with Immediate", "RDMA WRITE Only", "RDMA WRITE Only with Immediate", "RDMA READ Response Only", or the like.

For example, the indication information is a first data WR, and may indicate that the type of the first RDMA packet is the initial packet of the I/O data. The indication information is a middle data WR, and may indicate that the type of the first RDMA packet is the intermediate packet of the I/O data. The indication information is a last data WR, and may indicate that the type of the first RDMA packet is the initial packet of the I/O data. The indication information is an only data WR, and may indicate that the type of the first RDMA packet is the single packet of the I/O data.

S1504: If the indication information indicates that the type of the first RDMA packet is the initial packet or the intermediate packet of the I/O data, the NIC 112 sends the first RDMA packet to the host client.

This step may be performed by the second transceiver module 1122 of the NIC 112.

S1505: If the indication information indicates that the type of the first RDMA packet is the tail packet or the single packet of the I/O data, the NIC 112 sends, to the host client before polling an SQ of a next controller, the first RDMA packet and a second RDMA packet scheduled by a next WQE of the first WQE in the first SQ.

Specifically, if the indication information indicates that the type of the first RDMA packet is the tail packet or the single packet of the I/O data, the second transceiver module 1122 sends, to the host client before the second processing module 1121 polls the SQ of the next controller, the first RDMA packet and the second RDMA packet scheduled by the next WQE of the first WQE in the first SQ.

For a same controller, after submitting the WQE of the tail packet or the single packet of the I/O data to the first SQ, the first controller immediately submits a WQE of the I/O response of the I/O data to the first SQ. Therefore, if the indication information in the first WQE indicates that the type of the first RDMA packet scheduled by the first WQE is the tail packet or the single packet of the I/O data, the second RDMA packet scheduled by the next WQE of the first WQE in the first SQ is the I/O response. In other words, before polling the next SQ, the NIC sends, to the host client, the I/O response of the first SQ immediately following the I/O data of the first SQ, so that the host client can quickly confirm that the RDMA read operation is completed.

S1506: The host client receives the I/O response, and completes the RDMA read operation.

Figure 16:
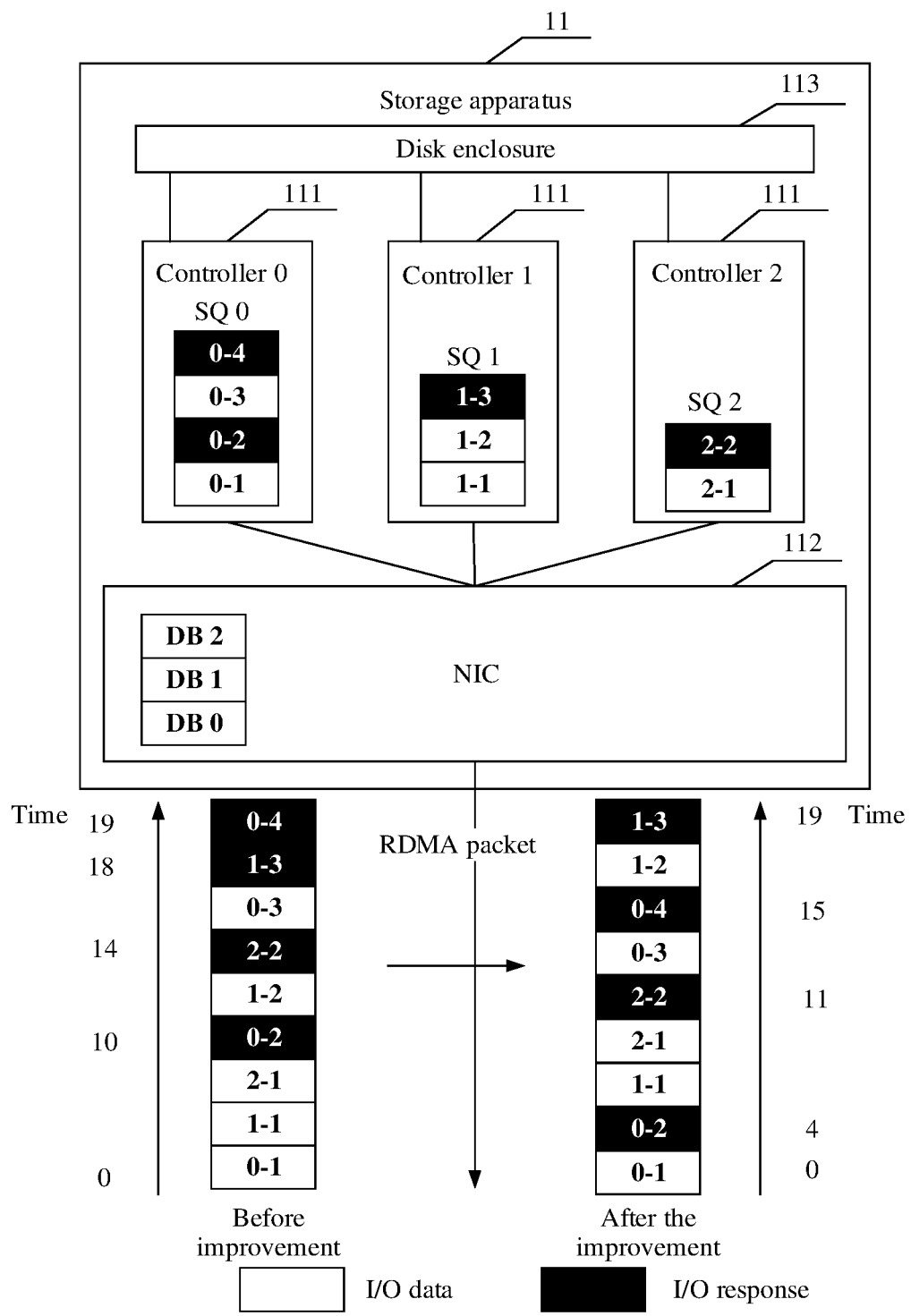
FIG. 16 is a schematic diagram of effect of reducing a delay of an RDMA read operation according to an embodiment of the present disclosure.

As shown in FIG. 16, it is assumed that a length of each RDMA packet is 8 KB, and it is assumed that sending time of the RDMA packet of the I/O data is three times that of the RDMA packet of the I/O response. In other words, the sending time of the RDMA packet of the I/O response is 1, and the sending time of the RDMA packet of the I/O data is 3.

For example, compared with the manner before improvement in FIG. 13, total time for completing sending I/O data (0-1) to an I/O response (0-2) of the controller 0 is 10. After the packet sending method in this embodiment is used for the improvement, the total sending time changes to 4. It can be seen that the completion time of the RDMA read operation after the improvement is significantly reduced. An average delay before the improvement is 15.25, and an average delay after the improvement is 12.25. Performance is improved by 20%. Similarly, total time for completing sending I/O data (2-1) to an I/O response (2-2) of the controller 2 is 8, and the total sending time changes to 4 after the improvement. Total time for completing sending I/O data (1-1) and I/O data (1-2) to an I/O response (3-3) of the controller 1 is 15, and the total sending time is 15 after the improvement. Total time for completing sending I/O data (0-3) to an I/O response (0-4) is 5, and the total sending time changes to 4 after the improvement.

A larger quantity of controllers indicates a longer RDMA packet length and more significant performance improvement after the improvement.

According to the foregoing network interface card, the controller, the storage apparatus, and the packet sending method provided in embodiments of the present disclosure, the network interface card (NIC) of the storage apparatus obtains the first WQE from the first SQ of the first controller, where the first WQE includes the indication information, and the indication information indicates the type of the first RDMA packet scheduled by the first WQE; and if the indication information indicates that the type of the first RDMA packet is the tail packet or the single packet of the I/O data, sends, to the host client before polling the SQ of the next controller, the first RDMA packet and the second RDMA packet (that is, the RDMA packet of the I/O response) scheduled by the next WQE of the first WQE in the first SQ. In this way, after receiving the tail packet or the single packet of the I/O data, the host client can quickly receive the corresponding I/O response, and determine to complete the RDMA read operation. There is no need to wait for the NIC to poll the first controller next time. Therefore, the delay of the RDMA read operation can be reduced.

In addition, the WQE submitted by each controller to the SQ includes check information DIF of an RDMA packet. Therefore, before sending the RDMA packet, the NIC needs to check a data integrity feature (DIF) of the RDMA packet.

Figure 17:
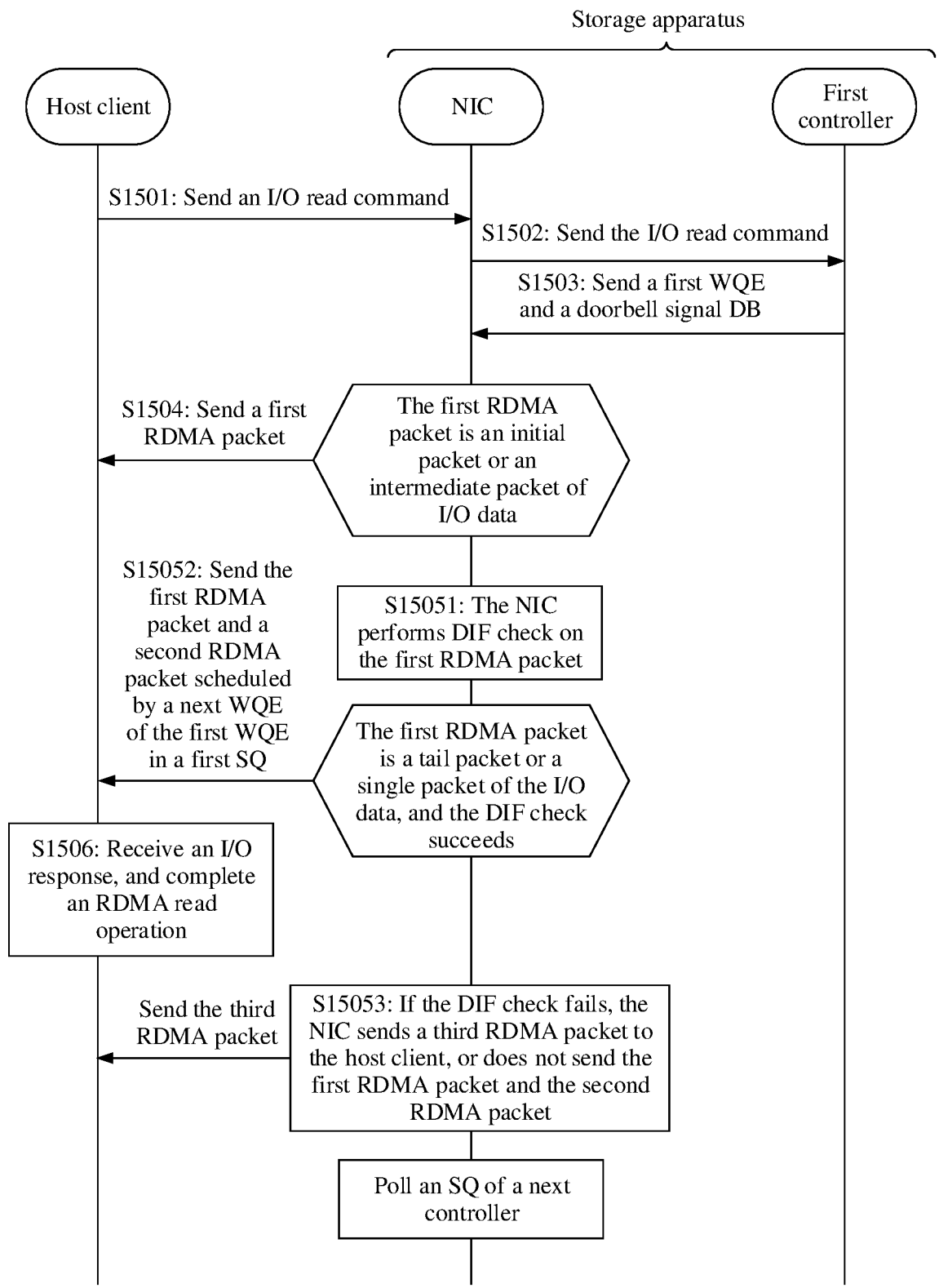
FIG. 17 is a schematic flowchart of another packet sending method according to an embodiment of the present disclosure.

Optionally, as shown in FIG. 17, step S1505 may include steps S15051 to S15053.

S15051: The NIC performs DIF check on the first RDMA packet.

The DIF check protects data integrity and consistency by adding check data to data.

Specifically, this step may be performed by the second processing module 1121 of the NIC 112.

S15052: If the indication information indicates that the type of the first RDMA packet is the tail packet or the single packet of the I/O data, and the DIF check succeeds, the NIC sends, to the host client before polling the SQ of the next controller, the first RDMA packet and the second RDMA packet scheduled by the next WQE of the first WQE in the first SQ.

Specifically, if the indication information indicates that the type of the first RDMA packet is the tail packet or the single packet of the I/O data, and DIF check performed by the second processing module 1121 succeeds, the second processing module 1121 sends, to the host client before polling the SQ of the next controller, the first RDMA packet and the second RDMA packet scheduled by the next WQE of the first WQE in the first SQ.

S15053: If the DIF check fails, the NIC sends a third RDMA packet to the host client, or does not send the first RDMA packet and the second RDMA packet.

The third RDMA packet indicates that DIF check on the first RDMA packet fails.

Specifically, if the DIF check performed by the second processing module 1121 fails, the second transceiver module 1122 sends the third RDMA packet to the host client. The third RDMA packet indicates that the DIF check on the first RDMA packet fails, that is, the NIC directly notifies the host client that the RDMA read operation fails. Alternatively, the second transceiver module 1122 neither sends the first RDMA packet nor sends the second RDMA packet to the host client, and if timing of the host client times out, the host client determines that the RDMA read operation fails.

In this optional implementation, DIF check may be performed on the RDMA packet before the RAMD packet is sent.

An embodiment of the present disclosure further provides a computer-readable storage medium. The computer-readable storage medium stores a computer program. When the computer-readable storage medium is run on a computer or a processor, the computer or the processor is enabled to perform the method corresponding to the NIC or the first controller in FIG. 15.

An embodiment of the present disclosure further provides a computer program product including instructions. When the instructions are run on a computer or a processor, the computer or the processor is enabled to perform the method corresponding to the NIC or the first controller in FIG. 15.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed systems, devices, and methods may be implemented in other manners. For example, the described device embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of the present disclosure may be integrated into one processing unit, or each of the units may exist alone physically, or two or more units may be integrated into one unit.

All or some of foregoing embodiments may be implemented by using software, hardware, firmware, or any combination thereof. When a software program is used to implement embodiments, all or a part of embodiments may be implemented in a form of a computer program product. The computer program product includes one or more computer instructions. When the computer program instructions are loaded and executed on a computer, the procedure or functions according to embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing description is merely a specific implementation of the present disclosure, but is not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network interface card, comprising:
at least one processor, configured to: in response to a doorbell signal of a controller, obtain a work queue element (WQE) from a send queue (SQ) corresponding to the controller, wherein the doorbell signal indicates that there is a to-be-sent message in a storage space to which at least one WQE points in the SQ, the WQE comprises indication information, and the indication information indicates a type of a first remote direct memory access (RDMA) packet scheduled by the WQE, wherein the type of the first RDMA packet comprises an initial packet, an intermediate packet, a tail packet, or a single packet of I/O data; and a transceiver, configured to: when the indication information indicates that the type of the first RDMA packet is a tail packet or a single packet of I/O data, send, to a host client before the at least one processor polls an SQ of a next controller, the first RDMA packet and a second RDMA packet scheduled by a next WQE of the WQE in the SQ, wherein the at least one processor is further configured to perform data integrity function (DIF) check on the first RDMA packet; and the transceiver is further configured to: when the indication information indication that the type of the first RDMA packet is the trail packet or the single packet of the I/O data, and the DIF check succeeds, send, to the host client before the at least one processor polls the SQ of the next controller, the first RDMA packet and the second RDMA packet scheduled by the next WQE of the WQE in the SQ.

2. The network interface card according to claim 1, wherein the transceiver is further configured to: when the DIF check fails, send a third RDMA packet to the host client, wherein the third RDMA packet indicates that the DIF check on the first RDMA packet fails.

3. A controller, comprising:
at least one processor, configured to submit a work queue element (WQE) to a send queue (SQ), wherein the WQE comprises indication information, and the indication information indicates a type of a first remote direct memory access (RDMA) packet scheduled by the WQE, wherein the type of the first RDMA packet comprises an initial packet, an intermediate packet, a tail packet, or a single packet of I/O data; and a transceiver, further configured to send a doorbell signal to a network interface card, wherein the doorbell signal indicates that there is a to-be-sent message in a storage space to which at least one WQE points in the SQ, so that the network interface card obtains the WQE from the SQ, performs data integrity function (DIF) check on the first RDMA packet, and when the indication information indicates that the type of the first RDMA packet is the tail packet or the single packet of the I/O data, and the DIF check succeeds, the network interface card sends, to a host client before polling the SQ of a next controller, the first RDMA packet and a second RDMA packet scheduled by a next WQE of the WQE in the SQ.

4. A packet sending method, comprising:
in response to a doorbell signal of a controller, obtaining a work queue element (WQE) from a send queue (SQ) corresponding to the controller, wherein the doorbell signal indicates that there is a to-be-sent message in a storage space to which at least one WQE points in the SQ, the WQE comprises indication information, and the indication information indicates a type of a first remote direct memory access (RDMA) packet scheduled by the WQE, wherein the type of the first RDMA packet comprises an initial packet, an intermediate packet, a tail packet, or a single packet of I/O data; and when the indication information indicates that the type of the first RDMA packet is a tail packet or a single packet of I/O data, sending, to a host client before polling an SQ of a next controller, the first RDMA packet and a second RDMA packet scheduled by a next WQE of the WQE in the SQ, wherein the indication information indicates that the type of the first RDMA packet is a tail packet or a single packet of I/O data, and the sending, to a host client before polling an SQ of a next controller, the first RDMA packet and second RDMA packet scheduled by a next WQE of the WQE in the SQ comprises:

performing data integrity function (DIF) check on the first RDMA packet; and when the indication information indicates that the type of the first RDMA packet is the tail packet or the single packet of the I/O data, and the DIF check succeeds, sending, to the host client before polling the SQ of the next controller, the first RDMA packet and the second RDMA packet scheduled by the next WQE of the WQE in the SQ.

5. The method according to claim 4, further comprising:

when the DIF check fails, sending a third RDMA packet to the host client, wherein the third RDMA packet indicates that the DIF check on the first RDMA packet fails.

6. A packet sending method, comprising:

submitting a work queue element (WQE) to a send queue (SQ), wherein the WQE comprises indication information, and the indication information indicates a type of a first remote direct memory access (RDMA) packet scheduled by the WQE, wherein the type of the first RDMA packet comprises an initial packet, an intermediate packet, a tail packet, or a single packet of I/O data; and sending a doorbell signal to a network interface card, wherein the doorbell signal indicates that there is a to-be-sent message in a storage space to which at least one WQE points in the SQ, so that the network interface card obtains the WQE from the SQ, performs data integrity function (DIF) check on the first RDMA packet, and when the indication information indicates that the type of the first RDMA packet is the tail packet or the single packet of the I/O data, and the DIF check succeeds, the network interface card sends, to a host client before polling the SQ of a next controller, the first RDMA packet and a second RDMA packet scheduled by a next WQE of the WQE in the SQ.

7. The method according to claim 6, wherein the type of the first RDMA packet comprises an initial packet, an intermediate packet, a tail packet, or a single packet of I/O data.

8. A non-transitory storage medium storing information comprising instructions that, when executed by at least one processor, control the at least one processor to perform operations comprising:

in response to a doorbell signal of a controller, obtaining a work queue element (WQE) from a send queue (SQ) corresponding to the controller, wherein the doorbell signal indicates that there is a to-be-sent message in a storage space to which at least one WQE points in the SQ, the WQE comprises indication information, and the indication information indicates a type of a first remote direct memory access (RDMA) packet scheduled by the WQE, wherein the type of the first RDMA packet comprises an initial packet, an intermediate packet, a tail packet, or a single packet of I/O data; and when the indication information indicates that the type of the first RDMA packet is a tail packet or a single packet of I/O data, sending, to a host client before polling an SQ of a next controller, the first RDMA packet and a second RDMA packet scheduled by a next WQE of the WQE in the SQ, wherein the indication information indicates that the type of the first RDMA packet is a tail packet or a single packet of I/O data, and the sending, to a host client before polling an SQ of a next controller, the first RDMA packet and second RDMA packet scheduled by a next WQE of the WQE in the SQ comprises:

performing data integrity function (DIF) check on the first RDMA packet; and when the indication information indicates that the type of the first RDMA packet is the tail packet or the single packet of the I/O data, and the DIF check succeeds, sending, to the host client before polling the SQ of the next controller, the first RDMA packet and the second RDMA packet scheduled by the next WQE of the WQE in the SQ.

9. The non-transitory storage medium according to claim 8, further comprising:

when the DIF check fails, sending a third RDMA packet to the host client, wherein the third RDMA packet indicates that the DIF check on the first RDMA packet fails.

10. The network interface card according to claim 1, wherein, when the type of the first RDMA packet is the tail packet or the single packet of the I/O data, the second RDMA packet scheduled by the next WQE in the SQ is an I/O response.

11. The network interface card according to claim 1, wherein the first RDMA packet is segmented into a plurality of RDMA packets, the initial packet is a first packet in the plurality of RDMA packets, the tail packet is a last packet in the plurality of RDMA packets, and the intermediate packet is a packet in the plurality of RDMA packets other than the initial packet and the tail packet.

12. The network interface card according to claim 1, wherein, when a length of the I/O data is greater than a path maximum transmission unit (PMTU), the I/O data is segmented into three types of RDMA packets comprising an initial packet, an intermediate packet, and a tail packet.

13. The network interface card according to claim 1, wherein, when a length of the I/O data is less than or equal to a PMTU, the I/O data is not segmented.

14. The network interface card according to claim 1, wherein the single packet is an RDMA packet in which a RDMA message is not segmented.

* * * * *

UNITED STATES PATENT AND TRADEMARK OFFICE
CERTIFICATE OF CORRECTION

PATENT NO. : 12,333,147 B2
APPLICATION NO. : 18/308118
DATED : June 17, 2025
INVENTOR(S) : Zhaojiao Han et al.

Page 1 of 1

It is certified that error appears in the above-identified patent and that said Letters Patent is hereby corrected as shown below:

In the Specification

Column 12, Line 12, change "RDMAread" to --RDMA read--; and

Column 12, Line 43, change "RDMAread" to --RDMA read--.

Signed and Sealed this
Fifteenth Day of July, 2025

Coke Morgan Stewart
*Acting Director of the United States Patent and Trademark Office*